(12) United States Patent
Nakamura

(10) Patent No.: US 7,196,856 B2
(45) Date of Patent: Mar. 27, 2007

(54) IMAGING LENS SYSTEM

(75) Inventor: Akira Nakamura, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/866,359

(22) Filed: Jun. 10, 2004

(65) Prior Publication Data
US 2005/0002116 A1 Jan. 6, 2005

(30) Foreign Application Priority Data
Jun. 13, 2003 (JP) .............................. 2003-169096

(51) Int. Cl.
*G02B 15/14* (2006.01)
*G02B 13/18* (2006.01)
*G02B 3/02* (2006.01)
(52) U.S. Cl. ...................................... 359/785; 359/716
(58) Field of Classification Search ................ 359/690, 359/785, 789, 790, 716, 784
See application file for complete search history.

(56) References Cited

U.S. PATENT DOCUMENTS

| | | | | |
|---|---|---|---|---|
| 5,600,490 A | * | 2/1997 | Sugawara et al. | 359/690 |
| 6,741,403 B2 | * | 5/2004 | Huang | 359/785 |
| 6,970,306 B2 | * | 11/2005 | Matsuo | 359/785 |
| 2003/0193605 A1 | | 10/2003 | Yamaguchi | |
| 2004/0179274 A1 | * | 9/2004 | Amanai | 359/785 |

FOREIGN PATENT DOCUMENTS

JP 2003-011239 * 11/2003

* cited by examiner

*Primary Examiner*—Alicia M Harrington
(74) *Attorney, Agent, or Firm*—Koda & Androlia

(57) ABSTRACT

An imaging lens system including a first lens having a main positive power whose convex surface faces an object side, a second lens in a meniscus shape having a negative power whose convex surface faces an image surface side, and a third lens having a positive power whose convex surface faces the object side. The three lenses are disposed in order from the object side to the image surface side.

12 Claims, 19 Drawing Sheets

LATERAL ABERRATION

LATERAL ABERRATION

LATERAL ABERRATION

LATERAL ABERRATION

LATERAL ABERRATION

LATERAL ABERRATION

IMAGING LENS SYSTEM

BACKGROUND OF THE INVENTION

1. Field of the Invention

The present invention relates to an imaging lens system and particularly, to an imaging lens system comprising three lenses which can be preferably reduced in size and weight to be used for an image-taking device utilizing an image sensor element such as a CCD, a CMOS or the like to be mounted on a portable computer, a visual telephone, a cellular phone, a digital camera and the like.

2. Description of the Related Art

Recently, there has been a remarkable development in the multimedia industry, and there has been an increasing demand for a camera utilizing an image sensor element such as a CCD, a CMOS or the like to be mounted on a portable computer, a visual telephone, a cellular phone, a digital camera and the like. Such CCD camera needs to be mounted on a limited space. Thus, it is desirable that the camera be small in size and light in weight.

Accordingly, an imaging lens system used for such CCD camera is also required to be small and lightweight as well. Conventionally, the so-called one-lens system using a single lens or the two-lens system using two lenses is used as such imaging lens system.

However, although these types are extremely advantageous in terms of reducing the size and weight of the lens system, they cannot sufficiently meet the high picture quality and high resolution which are required for the imaging lens system in these days.

Thus, conventionally, the three-lens system using three lenses has been utilized for meeting the demands for the high picture quality and high resolution (see Japanese Unexamined Patent Publication No. 2001-75006, Japanese Unexamined Patent Publication No. 2001-83409).

Recently, especially in the field of the digital cameras and the like, there has been an increasing demand for the image-taking devices using a solid image sensor element with a higher picture quality and resolution of more than 1,000,000 pixels, which tops the conventional CIF (about 110,000 pixels) and VGA (about 300,000 pixels).

However, the conventional lens system is not yet sufficient to achieve the demands for high optical performance such as a high picture quality and high resolution through well-correcting chromatic aberration and, at the same time, to achieve further reduction of the size and weight (shortening the whole length) of the lens system itself.

In the conventional lens system, the whole length cannot be shortened so much while the back focus distance can be maintained. Thus, it is difficult to shorten the whole length of the lens system while sufficiently maintaining a high telecentricity.

The present invention has been designed to overcome the foregoing problems. An object of the present invention is to provide an imaging lens system which can achieve reduction of the size and weight while maintaining a high optical performance. Further, another object of the present invention is to provide an imaging lens system which can maintain an appropriate back focus and, at the same time, maintain the high telecentricity.

SUMMARY OF THE INVENTION

In order to achieve the foregoing objects, an imaging lens system according to the present invention comprises: a first lens having a main positive power whose convex surface facing an object side; a second lens in a meniscus shape having a negative power whose convex surface facing an image surface side; and a third lens having a positive power whose convex surface facing the object side. The three lenses are being disposed in order from the object side to the image surface side.

With the imaging lens system, by the combination of the first lens, the second lens and the third lens, it becomes possible to achieve reduction of the size and weight while achieving an excellent correction of various aberrations such as the chromatic aberration, distortion, curvature of field and the like. Also, it enables to maintain the appropriate back focus and, at the same time, maintain the telecentricity by reducing the angle of incident of the incoming main light ray against a sensor surface of an image-taking element.

As described, the imaging lens system of the present invention is a small-and-light imaging lens system with an excellent optical performance, which can maintain the appropriate back focus and the appropriate telecentricity.

Further, in another aspect of the present invention, the imaging lens system of the present invention comprises a diaphragm being provided on an object side of the first lens system.

With the imaging lens system, further, a lens face of the fist lens having a main power can be positioned in the vicinity of the diaphragm where the light ray is not spread. Thus, it enables to appropriately concentrate the incoming light ray from the object side without deteriorating the aberrations.

As described, the imaging lens system of the present invention is the small-and-light imaging lens system with an excellent optical performance.

In still another aspect of the present invention, the diaphragm is provided between the first lens and the second lens of the imaging lens system.

With the imaging lens system, further, while maintaining the more excellent telecentricity by reducing the angle of incident of the main light ray against the sensor surface of the image-taking element, it enables to form each lens in a uniform thickness (in a shape with less differences of the thickness over the regions of the lens) through slightly weakening the power of the first lens. Thus, each lens can be more simply formed.

As described, the imaging lens system of the present invention is an imaging lens system with an improved moldability.

In a further aspect of the present invention, the imaging lens system satisfies the conditions expressed by each of the following expressions: $40<v_1<70$, $20<v_2<40$, $40<v_3<70$ (where, $v_1$: Abbe number of the first lens, $v_2$: Abbe number of the second lens, $v_3$: Abbe number of the third lens).

With the imaging lens system, further, the chromatic aberration can be more excellently corrected.

As described, the imaging lens system of the present invention is a small-and-light imaging lens system with an excellent optical performance in which the chromatic aberration is more excellently corrected.

In a still further aspect of the imaging lens system of the present invention, in a surface of the second lens on the image surface side, the radius of center curvature on a periphery side is formed larger than the radius of center curvature on a core side.

With the imaging lens system, further, it enables to correct the coma aberration and the curvature of field more excellently in the light rays with a large image height.

As described, the imaging lens system of the present invention is a small-and-light imaging lens system with an excellent optical performance in which the coma aberration and the curvature of field are more excellently corrected.

In a yet further aspect of the imaging lens system of the present invention, in a surface of the third lens on the object side, the radius of center curvature on a periphery side is formed larger than the radius of center curvature on a core side.

With the imaging lens system, further, it becomes possible to control over-correction of the aberration and suppress the acceleration of the curvature of field. Furthermore, it enables to form the lens in a shape with an excellent moldability and to suppress the decrease of the back focus.

As described, the imaging lens system of the present invention is a small-and-light imaging lens system with an excellent optical performance in which the curvature of field is more excellently corrected. Also, the moldability of the lens can be improved.

In a yet further aspect of the imaging lens system of the present invention, in a surface of the third lens on the image surface side, the radius of center curvature on a periphery side is formed larger than the radius of center curvature on a core side.

With the imaging lens system, further, over-correction of the aberration can be further effectively controlled and the deterioration of the curvature of field can be more effectively suppressed. Furthermore, it becomes possible to form the lens in a shape to have a more excellent moldability and more effectively suppress the decrease of the back focus.

As described, the imaging lens system of the present invention is a small-and-light imaging lens system with an excellent optical performance in which the curvature of field is more excellently corrected. Also, the moldability of the lens can be improved.

In a yet further aspect of the imaging lens system of the present invention, the surface of the third lens on the image surface side is formed in a shape which curves towards the object side from the core side to the periphery side.

With the imaging lens system, further, the coma aberration (especially in the periphery) is excellently corrected so that flares can be decreased.

As described, the imaging lens system of the present invention is an imaging lens system with an excellent optical performance in which the coma aberration is excellently corrected (especially in the periphery) and the flares are effectively decreased.

In a yet further aspect of the imaging lens system of the present invention, in each of the first lens, the second lens and the third lens, at least either one of the surfaces on the object side or the image surface side is formed in an aspherical shape.

With the imaging lens system, further, various aberrations can be more excellently corrected.

As described, the imaging lens system of the present invention is an imaging lens system with an excellent optical performance in which various aberrations are more excellently corrected.

In a yet further aspect of the imaging lens system of the present invention, at least one out of the first lens, the second lens and the third lens is formed by a resin material.

With the imaging lens system, further, it becomes possible to further improve the moldability of the lens so that the cost can be further reduced.

As described, the imaging lens system of the present invention is an imaging lens system with the improved moldability being achieved at a low cost.

In a yet further aspect of the present invention, the imaging lens system satisfies the condition expressed by the expression: $0.6<f_1/f<1.3$ (where, $f_1$: focal length of the first lens, f: focal length of the entire lens system).

With the imaging lens system, further, it becomes possible to correct the curvature of field and the chromatic aberration in a well-balanced manner.

As described, the imaging lens system of the present invention is a small-and-light imaging lens system with an excellent optical performance in which the curvature of field and the chromatic aberration are corrected in a well-balanced manner.

In a yet further aspect of the present invention, the imaging lens system satisfies the condition expressed by the expression: $-0.4<r_3/f<-0.1$ (where, $r_3$: radius of center curvature of a surface (first face) of the second lens on the object side).

With the imaging lens system, it becomes possible to correct the curvature of field more excellently by reducing Petzval sum.

As described, the imaging lens system of the present invention is an imaging lens system with an excellent optical performance in which the curvature of field is more excellently corrected.

In a yet further aspect of the present invention, the imaging lens system satisfies the condition expressed by the expression: $0.4<r_5/f<0.6$ (where, $r_5$: radius of center curvature of a surface (first face) of the third lens on the object side).

With the imaging lens system, further, it becomes possible to further reduce the angle of incident of the main light ray against the sensor surface of the image-taking element while enabling to more excellently correct the distortion.

As described, the imaging lens system of the present invention is an imaging les system with an excellent optical performance in which the distortion is more excellently corrected. Further, the telecentricity can be more excellently maintained.

DETAILED DESCRIPTION OF THE INVENTION

In the followings, an embodiment of the present invention will be described by referring to FIG. 1.

Figure 1:
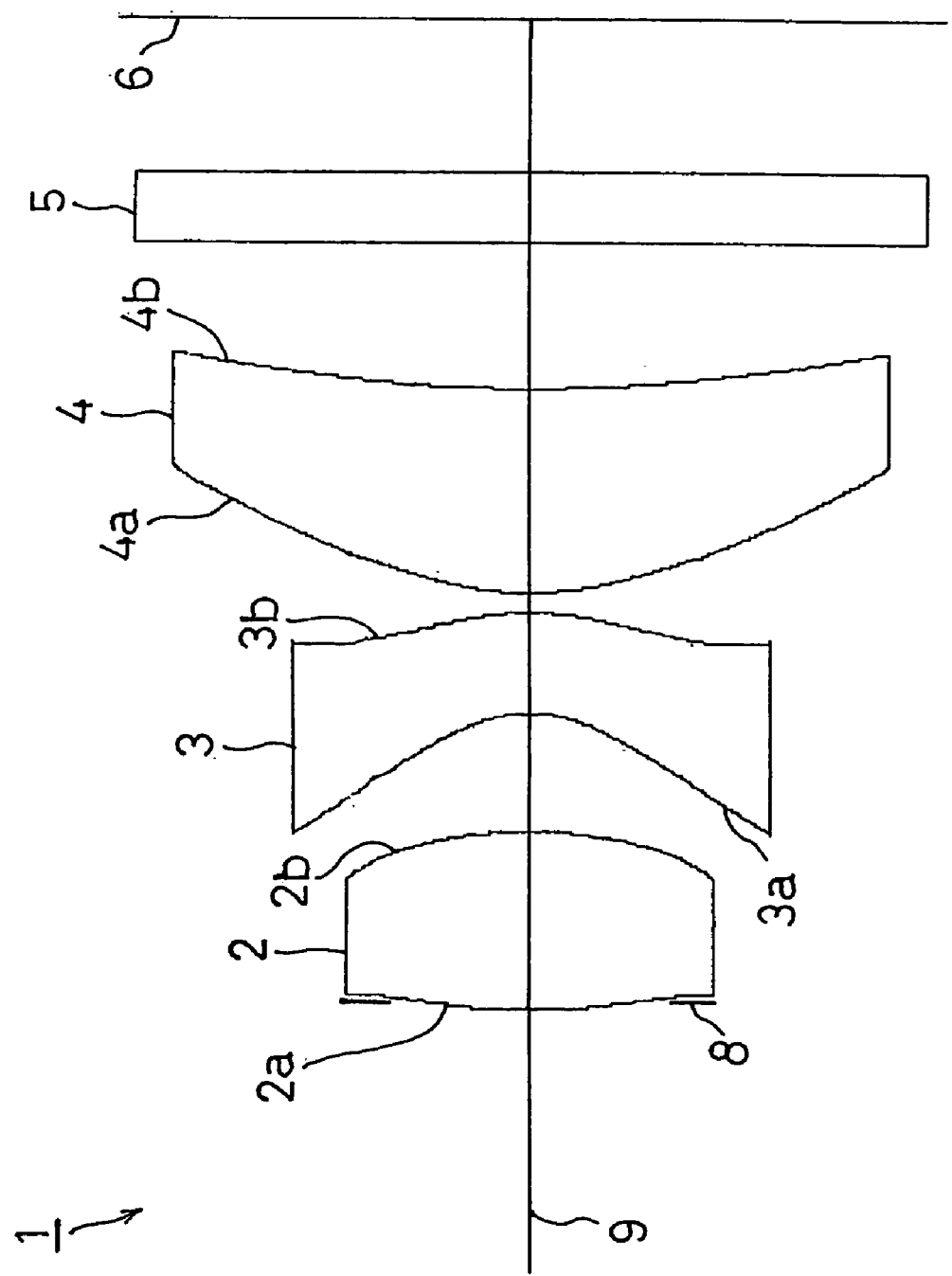
FIG. 1 is a schematic illustration showing an embodiment of an imaging lens system according to the present invention.

As shown in FIG. 1, an imaging lens system 1 of the embodiment comprises lenses, in order from an object side to an imaging surface side, a first lens 2 having a main positive power whose convex surface facing an object side, a second lens 3 in a meniscus shape having a negative power whose convex surface facing an imaging surface side, and a third lens 4 having a positive power whose convex surface facing the object side. A lens face 2a of the first lens 2 on the object side, a lens face 3a of the second lens 3, and a lens face 4a of the third lens 4 are referred to as first faces 2a, 3a, and 4a, respectively, while lens faces 2b, 3b, and 4b on the imaging surface side are referred to as second faces 2b, 3b, and 4b of the respective lenses.

On the second face 4b side of the third lens 4, various filters 5 such as a cover glass, an IR cut filter and a lowpass filter, and an image-taking surface 6 as a light-receiving surface of an image sensor element such as a CCD or a CMOS are provided, respectively. The various filters 5 may be omitted as appropriate.

In the embodiment, by the combination of the first lens 2, the second lens 3, and the third lens 4 formed as described above, it becomes possible to excellently correct various aberrations such as the chromatic aberration (magnification chromatic aberration, axial chromatic aberration), distortion, and curvature of field while enabling to reduce the size and the weight by shortening the whole length of the lens system.

Also, while shortening the whole length of the lens system, the necessary back focus can be sufficiently maintained. As a result, it becomes possible to provide a space sufficient for inserting the optical systems such as the various filters 5.

Further, it enables to maintain the telecentricity by reducing the angle (about 20°) of incident of the main light ray against the sensor surface of the image sensor element.

In addition to the above-described configuration, in the embodiment, a diaphragm 8 is further provided on the first face 2a side of the first lens 2.

Thereby, the low light ray can be passed through the lens face (the first face 2a) of the first lens 2 having a main power being positioned in the vicinity of the diaphragm 8 so that the incoming light ray from the object side can be sharply refracted to be concentrated without deteriorating the aberrations. As a result, the telecentricity can be further improved and the angle of the incident of the main light ray against the sensor surface of the image sensor element can be further reduced.

The disposing position of the diaphragm 8 is not limited to the first face 2a side of the first lens 2 but may be positioned between the first lens 2 and the second lens 3 (more preferably, in the vicinity of the second face 2b of the first lens 2).

IN this case, it is also possible to reduce the angle of incident of the main light ray against the sensor surface of the image sensor element and sufficiently maintain the telecentricity. Also, in this case, it is necessary to slightly weakening the power of the first lens 2 in order to correct the curvature of field and the chromatic aberration in a well-balanced manner. However, each of the lenses 2, 3 and 4 can be formed in more uniform thickness so that the moldability of the lenses 2, 3 and 4 can be improved, respectively.

Further, in the embodiment, the conditions expressed by each of the following expressions are to be satisfied:

$$40 < v_1 < 70 \quad (1)$$

$$20 < v_2 < 40 \quad (2)$$

$$40 < v_3 < 70 \quad (3)$$

where $v_1$ denotes Abbe number of the first lens, $v_2$ denotes Abbe number of the second lens, and $v_3$ denotes Abbe number of the third lens.

As described, by forming the first lens 2 and the third lens 4 using an optical material with a small color dispersion (v is large) and forming the second lens 3 using an optical material with a large color dispersion (v is small), it becomes possible to more excellently correct the chromatic aberration (magnification chromatic aberration, axial chromatic aberration).

Examples of the optical materials for forming each of the lenses 2, 3 and 4 may be glass and a resin material. When all of the lenses 2, 3 and 4 are formed using the resin material, they can be easily formed by injection-molding the resin and the like. Thereby, it enables to obtain the imaging lens system at a lower cost.

Further, in the embodiment, in the second face 3b of the second lens 3, the radius of center curvature of the lens face 3b on the periphery side is formed larger than the radius of the curvature in the center on the core side.

As a more specific example, the second face 3b of the second lens 3, which is the convex surface facing the imaging surface side as described, is formed in an aspherical shape in which the radius of center curvature gradually increases from an optical axis 9 side of the second lens face 3b towards the periphery side.

Thereby, in the high light ray, the coma aberration and the distortion can be more excellently corrected.

Also, in addition to the above-described configuration, the radius of center curvature of the first face 4a of the third lens 4 on the periphery side may be formed larger than the radius of center curvature on the core side.

As a more specific example, the first face 4a of the third lens 4, which is the convex surface facing the imaging surface side as described, may be formed in an aspherical shape in which the radius of center curvature gradually increases from an optical axis 9 side of the first lens face 4a towards the periphery side.

Thereby, further, it enables to control the over-correction of the aberrations and also to suppress the acceleration of the curvature of field. Furthermore, it becomes possible to provide the lens shape with an excellent moldability and to suppress the deterioration of the back focus.

Further, in addition to the above-described configuration, the radius of center curvature of the second face 4b of the third lens 4 on the periphery side may be formed larger than the radius of center curvature on the core side.

As a more specific example, the second face 4b of the third lens 4, which is the concave surface facing the object surface side as described, may be formed in an aspherical shape in which the radius of center curvature gradually increases from the optical axis 9 side of the second lens face 4b towards the periphery side.

Thereby, it enables to control the over-correction of the aberrations and also to suppress the acceleration of the curvature of field. Furthermore, it becomes possible to provide the lens shape with a more excellent moldability and to further suppress the decrease of the back focus.

Further, in addition to the above-described configuration, the second face 4b of the third lens 4 may be formed in the shape which curves towards the object side from the core side towards the periphery.

Thereby, the coma aberration can be more excellently corrected (especially in the periphery) and the flares can be decreased.

In addition to the above-described configuration, further, in each of the first lens 2, the second lens 3 and the third lens 4, at least either the first faces 2a, 3a, 4a or the second faces of 2b, 3b, 4b may be formed in an aspherical shape.

Thereby, various aberrations such as the chromatic aberration and the like can be more excellently corrected.

Further, in the embodiment, the condition expressed by a following expression (4) is to be satisfied:

$$0.6 < f_1/f < 1.3 \qquad (4)$$

where, $f_1$ denotes the focal length of the first lens and f denotes the focal length of the entire lens system.

When the value of $f_1/f$ is less than the value (0.6) shown in the expression (4), the curvature of field increases so that it becomes difficult to obtain an excellent picture.

On the other hand, when the value of $f_1/f$ is over the value (1.3) shown in the expression (4), it becomes difficult to correct the chromatic aberration.

Accordingly, in the embodiment, by setting the value of $f_1/f$ to satisfy the expression (4), it becomes possible to correct the curvature of field and the chromatic aberration in a more well-balanced manner.

Further, in the embodiment, the condition expressed by a following expression (5) is to be satisfied:

$$-0.4 < r_3/f < -0.1 \text{ (more preferably, } -0.27 < r_3/f < -0.16) \qquad (5)$$

where, $r_3$ denotes the radius of center curvature of the first face 3a of the second lens 3.

When the value of $r_3/f$ is less than the value (-0.4) shown in the expression (5), the curvature of field cannot be sufficiently corrected.

On the other hand, when the value of $r_3/f$ is over the value (-0.1) shown in the expression (5), over-correction is caused which results in inclination of the image surface.

Accordingly, in the embodiment, by setting the value of $f_3/f$ to satisfy the expression (5), it becomes possible to more excellently correct the curvature of field by decreasing the Petzval sum.

Further, in the embodiment, the condition expressed by a following expression (6) is to be satisfied:

$$0.4 < r_5/f < 0.6 \text{ (more preferably, } 0.43 < r_5/f < 0.57) \qquad (6)$$

where, $r_5$ denotes the radius of center curvature of the first face 4a of the third lens 4.

When the value of $r_5/f$ is less than the value (0.4) shown in the expression (6), the curvature of the first face 4a of the third lens 4 becomes too large so that the negative distortion becomes large and the coma aberration is deteriorated.

On the other hand, when the value of $r_5/f$ is over the value (0.6) shown in the expression (6), the angle of incident of the main light ray against the sensor surface of the image sensor element becomes large so that the telecentricity cannot be maintained.

Accordingly, in the embodiment, by setting the value of $f_5/f$ to satisfy the expression (6), it becomes possible to maintain the angle of incident of the main light ray lower against the sensor surface of the image sensor element and the distortion can be more excellently corrected.

In addition to the above-described configuration, the condition expressed by a following expression (7) may be satisfied:

$$-0.45 < r_4/f < -0.35 \text{ (more preferably, } -0.41 < r_4/f < -0.35) \qquad (7)$$

where, $r_4$ denotes the radius of the curvature in the center of the second face 3b of the second lens 3.

As described, by setting the value of $f_4/f$ to satisfy the expression (7), generation of the coma aberration can be more effectively suppressed.

EXAMPLES

Next, EXAMPLES of the present invention will be described by referring to FIG. 2 to FIG. 19.

In the Examples, F NO denotes F number, ω denotes a half angle of view, and r denotes the radius of center curvature. Further, d denotes the distance to the next optical surface, nd denotes the index of refraction against the d line (yellow) and vd denotes the Abbe number (d line being the reference).

k, A, B, C and D denote each coefficient in a following expression (8). In other words, the shape of the aspherical surface is expressed by the following expression provided that the optical axial direction is taken as the Z axis, the direction orthogonal to the optical axis is the X axis, the forwarding direction of light is positive, k is the constant of cone, A, B, C, D are the aspherical coefficients, and r is the radius of center curvature:

$$Z(X) = r^{-1}X^2/[1+\{1-(k+1)r^{-2}X^2\}^{1/2}] + AX^4 + BX^6 + CX^8 + DX^{10} \qquad (8)$$

First Example

Figure 2:
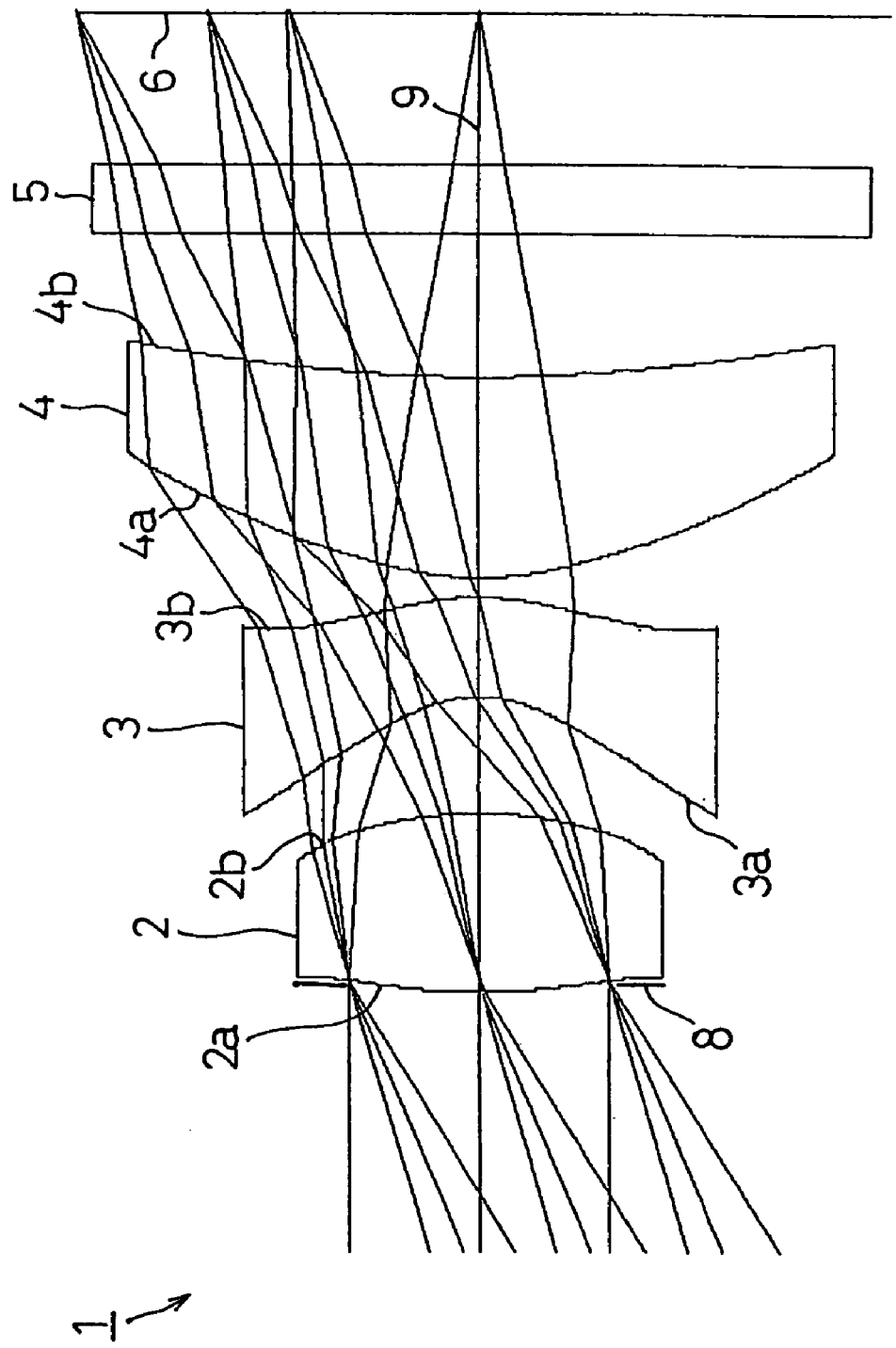
FIG. 2 is a schematic illustration showing FIRST EXAMPLE of an imaging lens system according to the present invention.

FIG. 2 shows FIRST EXAMPLE of the present invention. In FIRST EXAMPLE, a diaphragm 8 was disposed on the first face 2a side of the first lens 2 in the same manner as the one shown in FIG. 1. In FIRST EXAMPLE, the diaphragm 8 was regarded as the same surface as the first face 2a of the first lens 2. The first to third lenses were formed using a resin material, respectively.

An imaging lens system 1 of FIRST EXAMPLE was set under the following condition.

f=4.75 mm, F NO=2.8, ω=29°, $f_1$=3.4965 mm

| Face Number | r | d | nd | vd |
|---|---|---|---|---|
| (Object Point) | ∞ | | | |
| 1(First Face of First Lens)(Diaphragm) | 3.704 | 1.25 | 1.525 | 56 |
| 2(Second Face of First Lens) | −3.212 | 0.81 | | |
| 3(First Face of Second Lens) | −0.813 | 0.70 | 1.584 | 30 |
| 4(Second Face of Second Lens) | −1.844 | 0.13 | | |
| 5(First Face of Third Lens) | 2.024 | 1.42 | 1.525 | 56 |
| 6(Second Face of Third Lens) | 9.588 | 1.00 | | |
| 7(First Face of Cover Glass) | 0.0 | 0.50 | 1.517 | 64 |
| 8(Second Face of Cover Glass) (Image Surface) | 0.0 | | | |

| Face No. | k | A | B | C | D |
|---|---|---|---|---|---|
| 1 | −21.4192 | 0.27241073e−01 | −0.33111515e−01 | 0.00000000e+00 | 0.00000000e+00 |
| 2 | 0.6432 | −0.38977553e−01 | −0.87389020e−02 | 0.00000000e+00 | 0.00000000e+00 |
| 3 | −1.9035 | 0.24229716e−01 | 0.00000000e+00 | 0.00000000e+00 | 0.00000000e+00 |
| 4 | −0.1148 | 0.10234639e+00 | 0.33414204e−03 | 0.00000000e+00 | 0.00000000e+00 |
| 5 | −4.8595 | 0.48996684e−02 | −0.10838753e−03 | 0.00000000e+00 | 0.00000000e+00 |
| 6 | 0.0000 | −0.18867854e−02 | 0.13362654e−03 | 0.00000000e+00 | 0.00000000e+00 |

Under such conditions, $v_1$=56, $v_2$=30, $v_3$=56 were achieved, thereby satisfying the conditions expressed by each of the expressions (1) to (3). Also, $f_1/f$=0.74 was achieved, thereby satisfying the condition expressed by the expression (4). Further, $f_3/f$=−0.17 was achieved, thereby satisfying the condition expressed by the expression (5). Further, $r_5/f$=0.43 was achieved, thereby satisfying the condition expressed by the expression (6). Furthermore, $r_4/f$=−0.39 was achieved, thereby satisfying the condition expressed by the expression (7).

Figure 3:
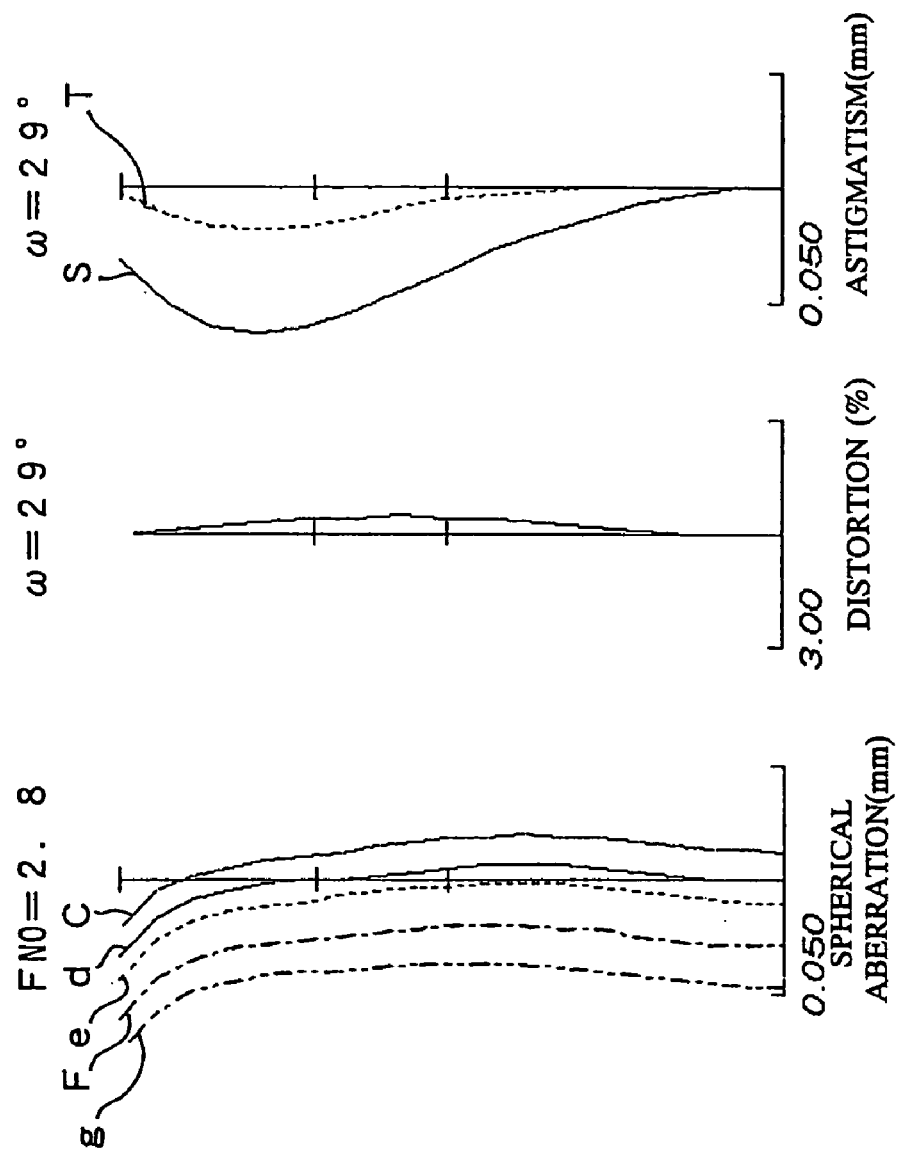
FIG. 3 is an explanatory illustration showing spherical aberration, distortion and astigmatism of the imaging lens system shown in FIG. 2.
Figure 4:
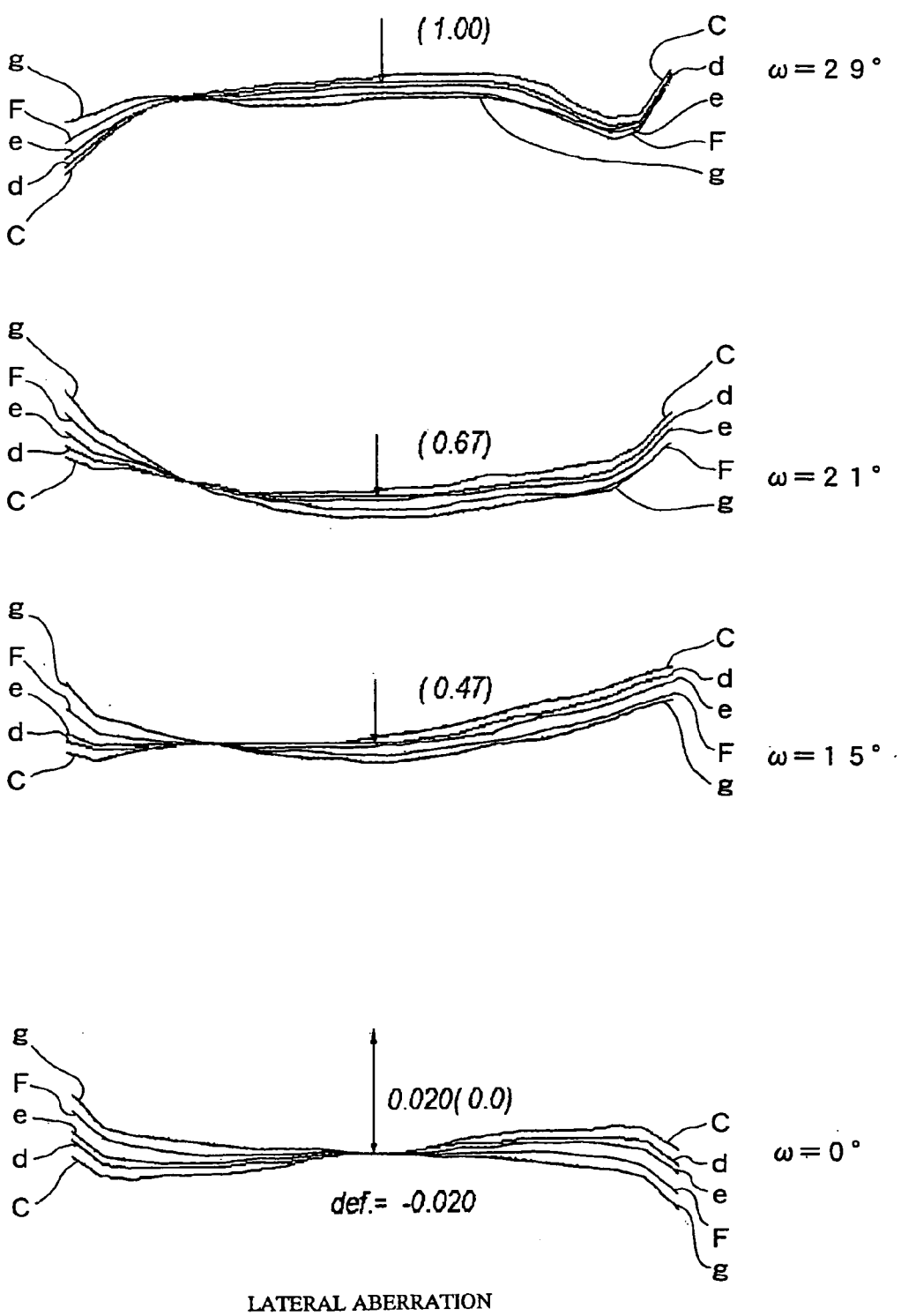
FIG. 4 is an explanatory illustration showing lateral aberration of the imaging lens system shown in FIG. 2.

FIG. 3 shows the spherical aberration, the distortion and the astigmatism of the imaging lens system of FIRST EXAMPLE and FIG. 4 shows the lateral aberration.

The spherical aberration, the distortion, the astigmatism and the lateral aberration were all satisfied. According to the results, it can be seen that a sufficient optical property can be obtained. Also, the angle of incident against the sensor surface of the image sensor element can be controlled below 19.3° and the telecentricity can be excellently maintained.

Second Example

Figure 5:
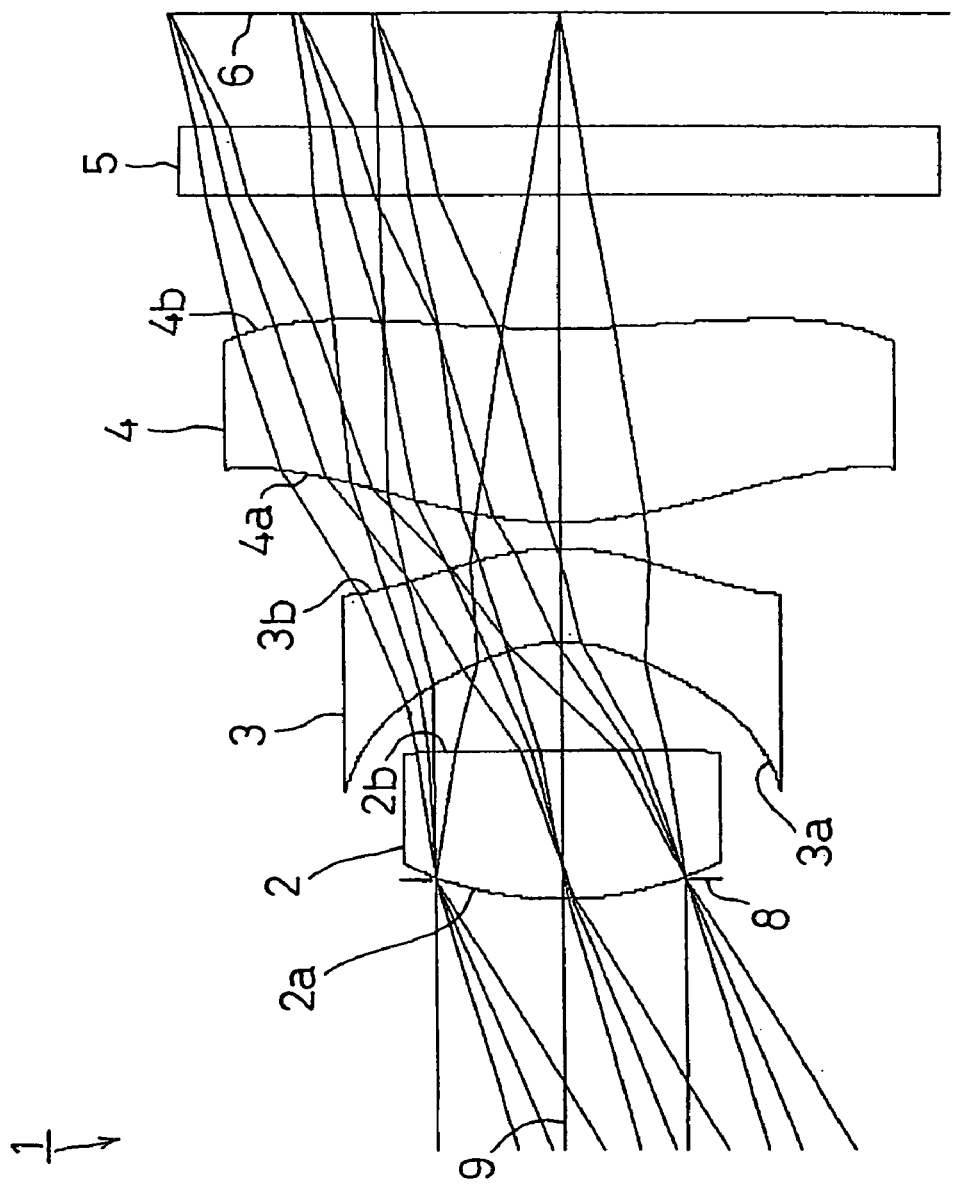
FIG. 5 is a schematic illustration showing SESOND EXAMPLE of an imaging lens system according to the present invention.

FIG. 5 shows SECOND EXAMPLE of the present invention. In SECOND EXAMPLE, the diaphragm 8 was disposed on the first face 2a side of the first lens 2 in the same manner as the one shown in FIG. 1. In SECOND EXAMPLE, the diaphragm 8 was regarded as the same surface as the first face 2a of the first lens 2. The first to third lenses were formed using a resin material, respectively.

The imaging lens system 1 of SECOND EXAMPLE was set under the following condition.

f=4.75 mm, F NO=2.8, ω=29°, $f_1$=4.2889 mm

| Face Number | r | d | nd | vd |
|---|---|---|---|---|
| (Object Point) | ∞ | | | |
| 1(First Face of First Lens)(Diaphragm) | 2.250 | 1.10 | 1.525 | 56 |
| 2(Second Face of First Lens) | ∞ | 0.81 | | |
| 3(First Face of Second Lens) | −1.013 | 0.70 | 1.585 | 30 |
| 4(Second Face of Second Lens) | −1.706 | 0.20 | | |
| 5(First Face of Third Lens) | 2.564 | 1.43 | 1.525 | 56 |
| 6(Second Face of Third Lens) | 7.304 | 1.00 | | |
| 7(First Face of Cover Glass) | 0.0 | 0.50 | 1.517 | 64 |
| 8(Second Face of Cover Glass) (Image Surface)) | 0.0 | | | |

| Face No. | k | A | B | C | D |
|---|---|---|---|---|---|
| 1 | 1.4480 | −0.10866073e−01 | −0.11267031e−01 | 0.00000000e+00 | 0.00000000e+00 |
| 2 | 0.0000 | 0.17543866e−02 | −0.11877248e−01 | 0.00000000e+00 | 0.00000000e+00 |
| 3 | −0.5802 | 0.19193526e+00 | −0.35641907e−01 | 0.00000000e+00 | 0.00000000e+00 |
| 4 | −0.4268 | 0.82018154e−01 | 0.00000000e+00 | 0.00000000e+00 | 0.00000000e+00 |
| 5 | −5.5851 | −0.27816427e−02 | −0.11903229e−02 | 0.00000000e+00 | 0.00000000e+00 |
| 6 | 0.0000 | −0.21979345e−01 | 0.34671159e−02 | −0.78831066e−03 | 0.60905481e−00 |

Under such conditions, $v_1$=56, $v_2$=30, $v_3$=56 were achieved, thereby satisfying the conditions expressed by each of the expressions (1) to (3). Also, $f_1/f$=0.90 was achieved, thereby satisfying the condition expressed by the expression (4). Further, $r_3/f$=−0.21 was achieved, thereby satisfying the condition expressed by the expression (5). Furthermore, $r_5/f$=0.54 was achieved, thereby satisfying the condition expressed by the expression (6). Moreover, $r_4/f$=−0.36 was achieved, thereby satisfying the condition expressed by the expression (7).

Figure 6:
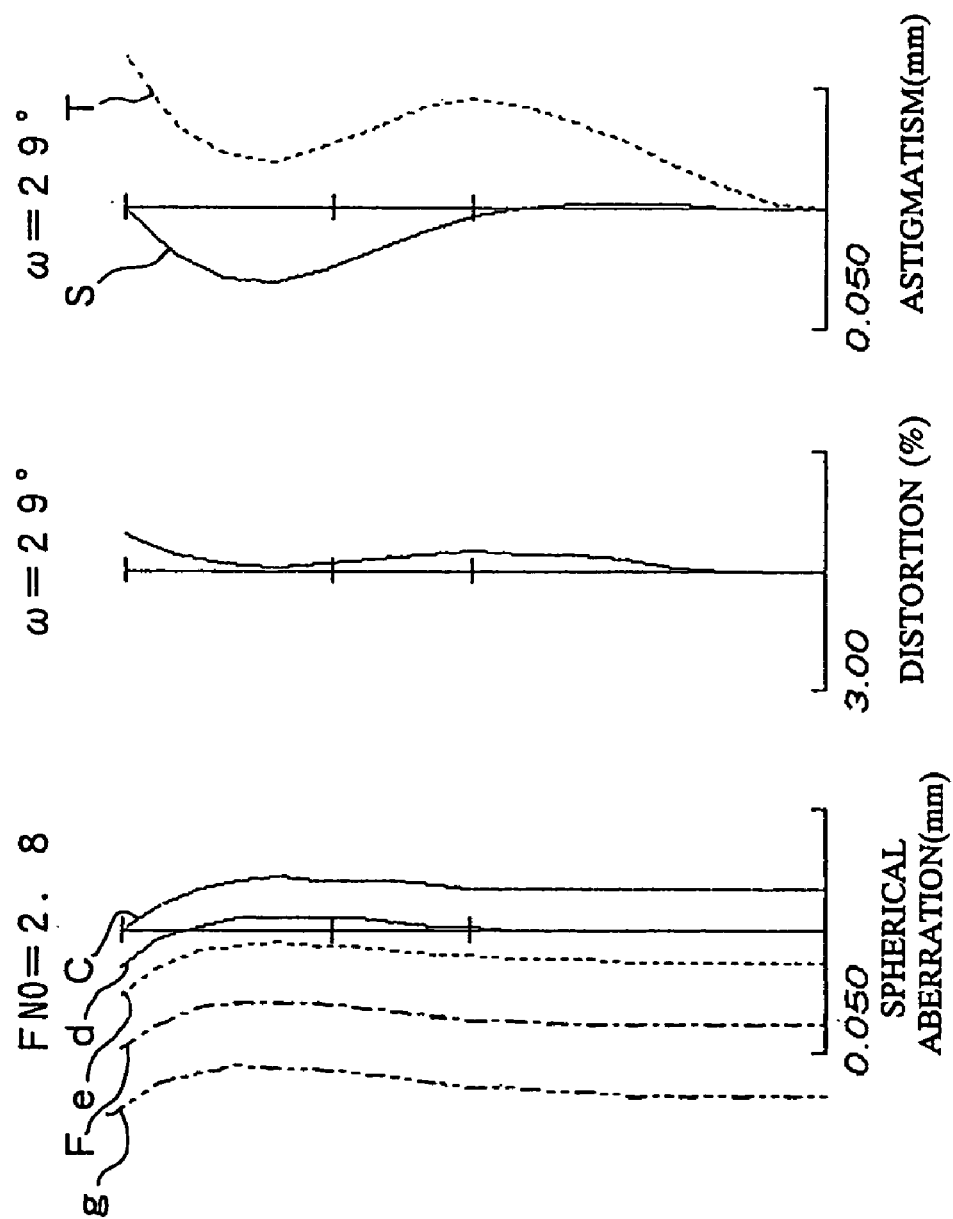
FIG. 6 is an explanatory illustration showing spherical aberration, distortion and astigmatism of the imaging lens system shown in FIG. 5.
Figure 7:
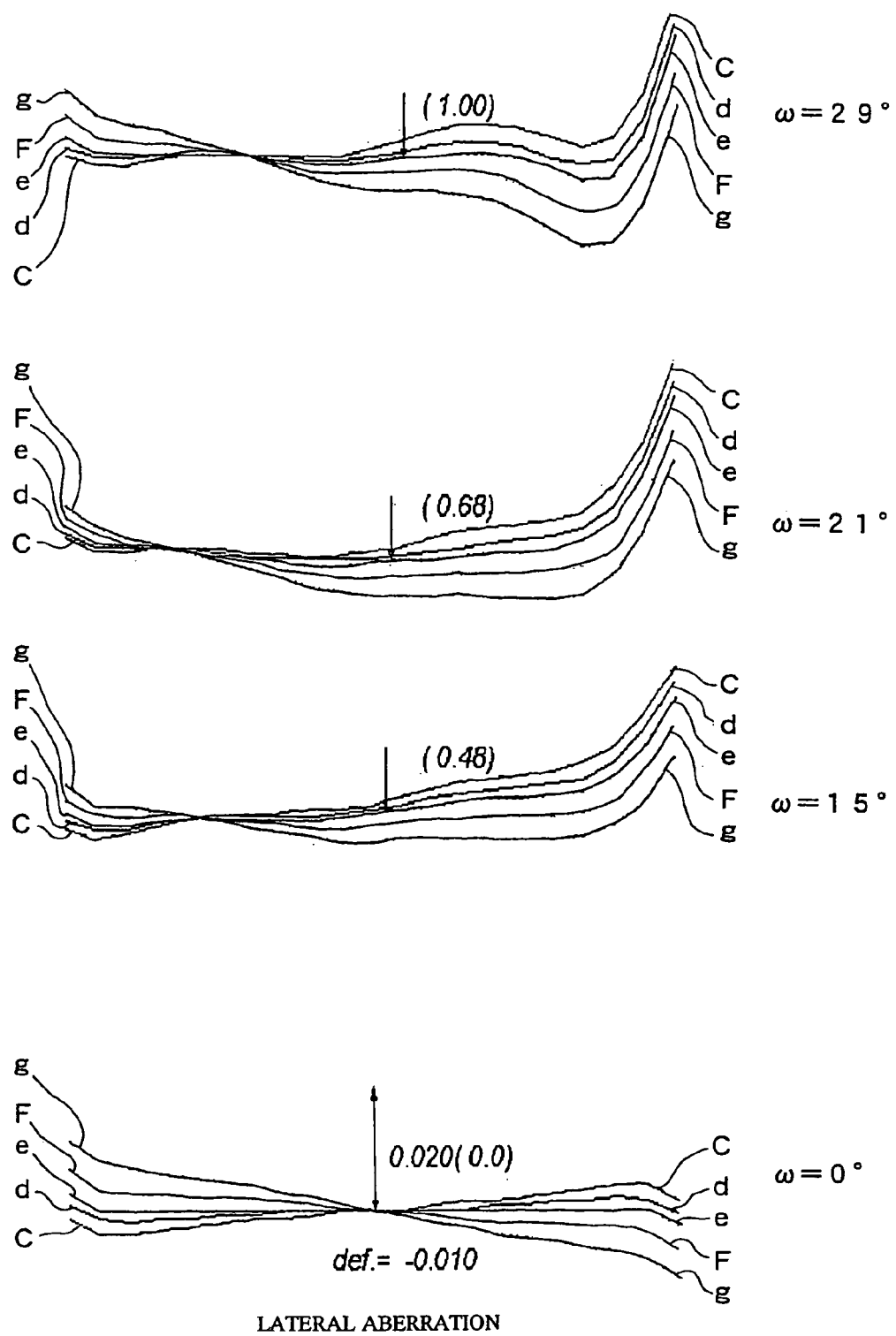
FIG. 7 is an explanatory illustration showing lateral aberration of the imaging lens system shown in FIG. 5.

FIG. 6 shows the spherical aberration, the distortion and the astigmatism of the imaging lens system of SECOND EXAMPLE and FIG. 7 shows the lateral aberration.

The spherical aberration, the distortion, the astigmatism and the lateral aberration were all satisfied. According to the results, it can be seen that a sufficient optical property can be obtained. Also, the angle of incident against the sensor surface of the image sensor element can be controlled below 18.9° and the telecentricity can be excellently maintained.

Third Example

Figure 8:
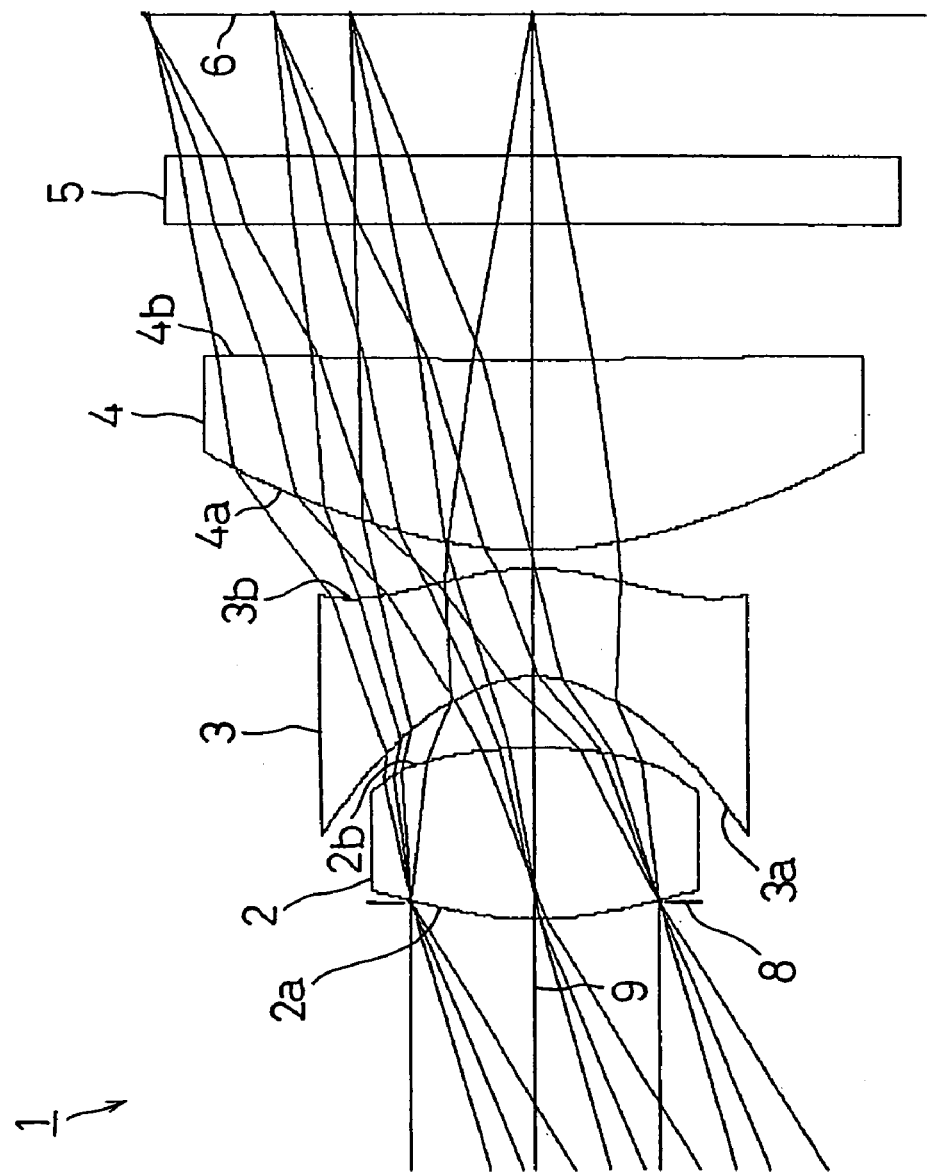
FIG. 8 is a schematic illustration showing THIRD EXAMPLE of an imaging lens system according to the present invention.

FIG. 8 shows THIRD EXAMPLE of the present invention. In THIRD EXAMPLE, the diaphragm 8 was disposed on the first face 2a side of the first lens. 2 in the same manner as the one shown in FIG 1. In THIRD EXAMPLE, the diaphragm 8 was regarded as the same surface as the first face 2a of the first lens 2. The first to third lenses were formed using a resin material, respectively.

The imaging lens system 1 of THIRD EXAMPLE was set under the following condition.

f=4.75 mm, F NO=2.8, ω=29°, $f_1$=3.0771 mm

| Face Number | r | d | nd | vd |
|---|---|---|---|---|
| (Object Point) | ∞ | | | |
| 1(First Face of First Lens)(Diaphragm) | 2.375 | 1.2678 | 1.525 | 56 |
| 2(Second Face of First Lens) | −4.115 | 0.5445 | | |
| 3(First Face of Second Lens) | −0.776 | 0.7917 | 1.584 | 30 |
| 4(Second Face of Second Lens) | −1.767 | 0.1409 | | |
| 5(First Face of Third Lens) | 2.651 | 1.4021 | 1.525 | 56 |
| 6(Second Face of Third Lens) | 26.516 | 1.0000 | | |
| 7(First Face of Cover Glass) | 0.0 | 0.5000 | 1.517 | 64 |
| 8(Second Face of Cover Glass) | 0.0 | | | |
| (Image Surface) | | | | |

| Face No. | k | A | B | C | D |
|---|---|---|---|---|---|
| 1 | −12.6539 | 0.92719822e−01 | −0.57596730e−01 | 0.00000000e+00 | 0.00000000e+00 |
| 2 | 1.2461 | −0.68271565e−01 | −0.35549128e−01 | 0.00000000e+00 | 0.00000000e+00 |
| 3 | −1.6898 | −0.51851761e−01 | 0.00000000e+00 | 0.00000000e+00 | 0.00000000e+00 |
| 4 | 0.0348 | 0.10625124e+00 | 0.11543488e−01 | 0.00000000e+00 | 0.00000000e+00 |
| 5 | −3.7428 | −0.15760470e−02 | 0.54496828e−03 | 0.00000000e+00 | 0.00000000e+00 |
| 6 | 0.0000 | −0.35219513e−02 | 0.21936017e−03 | 0.00000000e+00 | 0.00000000e+00 |

Under such conditions, $v_1$=56, $v_2$=30, $v_3$=56 were achieved, thereby satisfying the conditions expressed by each of the expressions (1) to (3). Also, $f_1/f$=0.65 was achieved, thereby satisfying the condition expressed by the expression (4). Further, $r_3/f$=−0.16 was achieved, thereby satisfying the condition expressed by the expression (5). Furthermore, $r_5/f$=0.56 was achieved, thereby satisfying the condition expressed by the expression (6). Moreover, $r_4/f$=−0.37 was achieved, thereby satisfying the condition expressed by the expression (7).

Figure 9:
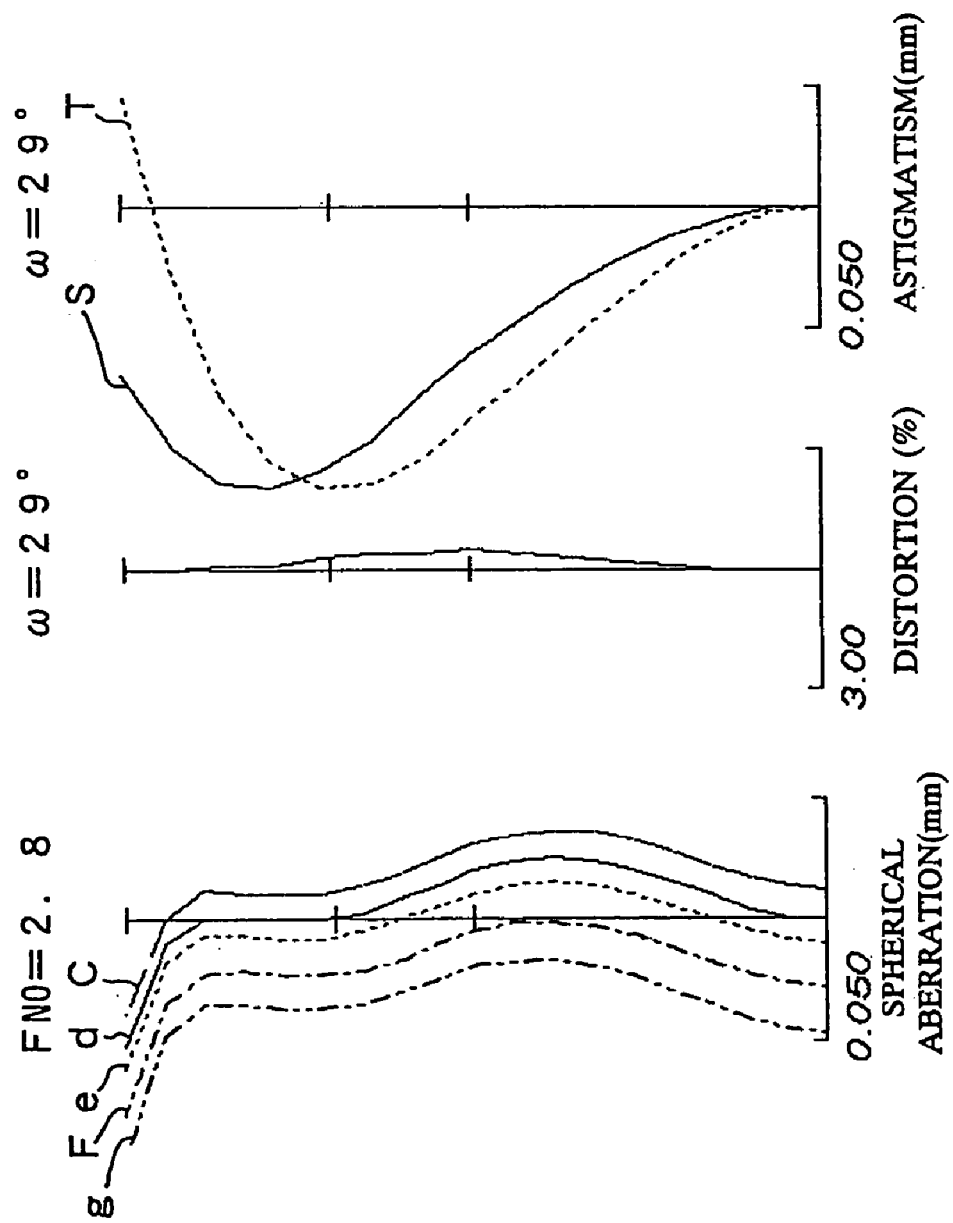
FIG. 9 is an explanatory illustration showing spherical aberration, distortion and astigmatism of the imaging lens system shown in FIG. 8.
Figure 10:
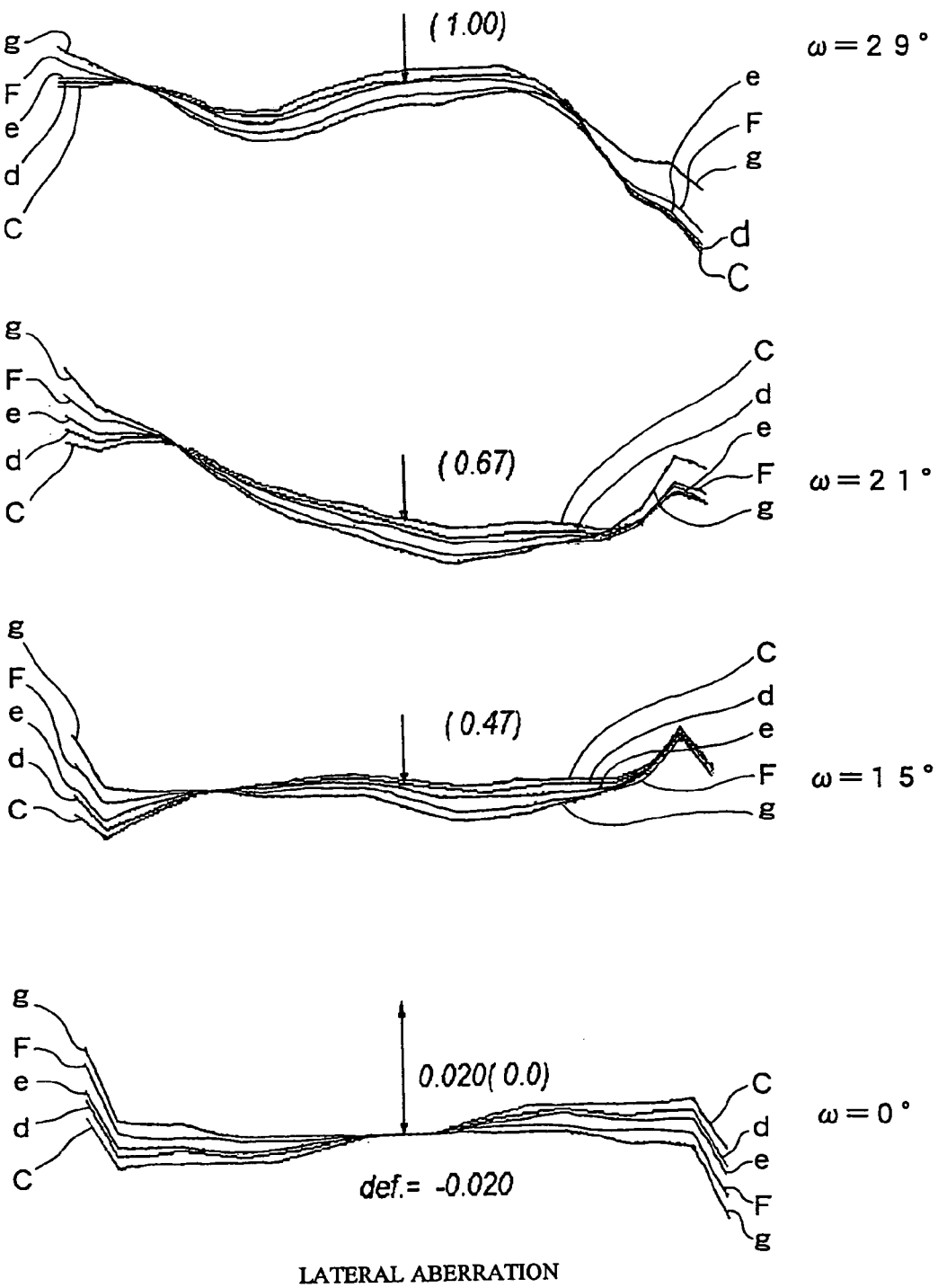
FIG. 10 is an explanatory illustration showing lateral aberration of the imaging lens system shown in FIG. 8.

FIG. 9 shows the spherical aberration, the distortion and the astigmatism of the imaging lens system of THIRD EXAMPLE and FIG. 10 shows the lateral aberration.

The spherical aberration, the distortion, the astigmatism were all satisfied. According to the results, it can be seen that a sufficient optical property can be obtained. Also, the angle of incident against the sensor surface of the image sensor element can be controlled below 19.5° and the telecentricity can be excellently maintained.

Fourth Example

Figure 11:
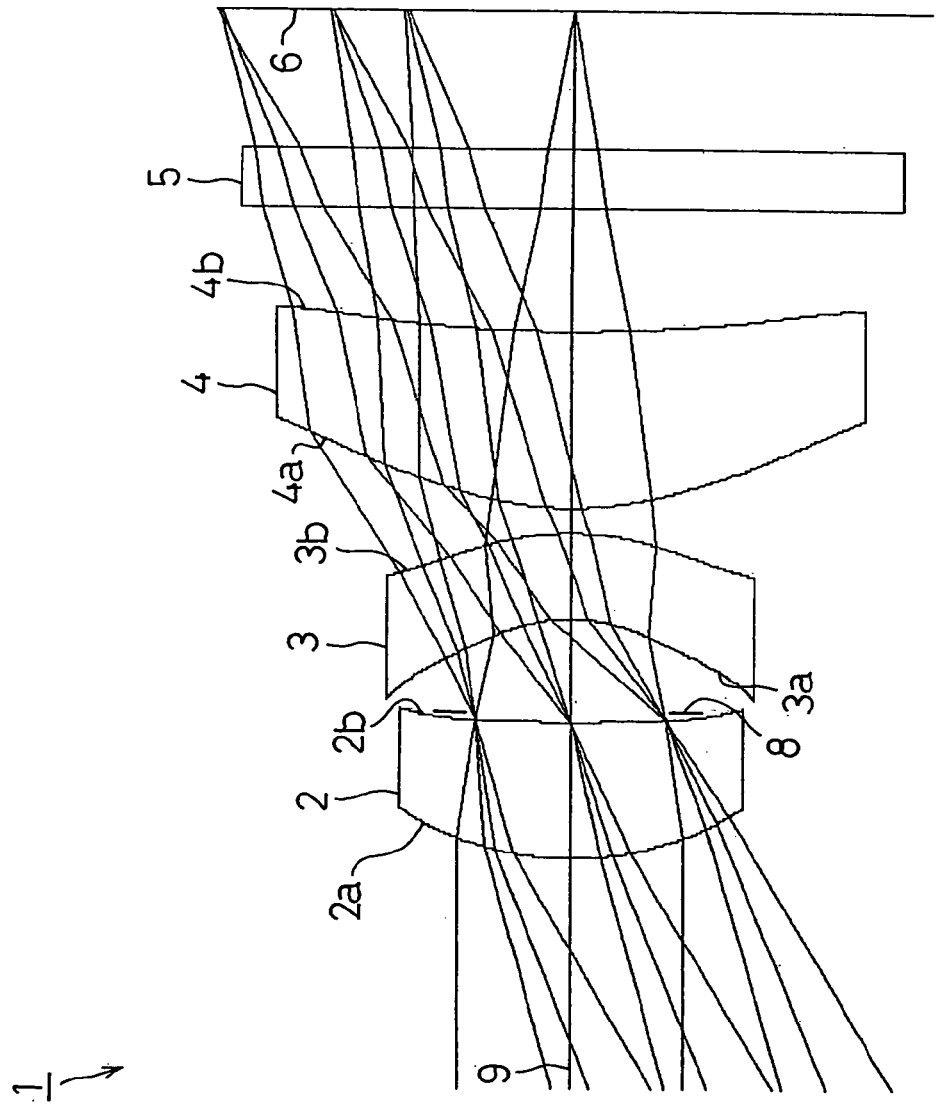
FIG. 11 is a schematic illustration showing FOURTH EXAMPLE of an imaging lens system according to the present invention.

FIG. 11 shows FOURTH EXAMPLE of the present invention. In FOURTH EXAMPLE, the diaphragm 8 was disposed between the first lens 2 and the second lens 3, which differs from the one shown in FIG. 1. In FOURTH EXAMPLE, the diaphragm 8 was regarded as the same surface as the second face 2b of the first lens 2. The first to third lenses were formed using a resin material, respectively.

The imaging lens system 1 of FOURTH EXAMPLE was set under the following condition.

f=4.75 mm, F NO=2.8, ω=29°, $f_1$=5.2101 mm

| Face Number | r | d | nd | vd |
|---|---|---|---|---|
| (Object Point) | ∞ | | | |
| 1(First Face of First Lens) | 2.365 | 1.11 | 1.525 | 56 |
| 2(Second Face of First Lens)(Diaphragm) | 14.696 | 0.85 | | |
| 3(First Face of Second Lens) | −1.114 | 0.70 | 1.585 | 30 |
| 4(Second Face of Second Lens) | −1.821 | 0.20 | | |
| 5(First Face of Third Lens) | 2.463 | 1.43 | 1.525 | 56 |
| 6(Second Face of Third Lens) | 11.802 | 1.00 | | |

-continued

| Face Number | r | d | nd | vd |
|---|---|---|---|---|
| 7(First Face of Cover Glass) | 0.0 | 0.50 | 1.517 | 64 |
| 8(Second Face of Cover Glass) | 0.0 | | | |
| (Image Surface) | | | | |

| Face No. | k | A | B | C | D |
|---|---|---|---|---|---|
| 1 | 0.8469 | −0.15628182e−02 | 0.45782756e−03 | 0.00000000e+00 | 0.00000000e+00 |
| 2 | 0.0000 | 0.15086987e−01 | 0.38538128e−02 | 0.00000000e+00 | 0.00000000e+00 |
| 3 | −0.4868 | 0.15671064e+00 | −0.79189770e−02 | 0.00000000e+00 | 0.00000000e+00 |
| 4 | −0.2239 | 0.66052107e−01 | 0.00000000e+00 | 0.00000000e+00 | 0.00000000e+00 |
| 5 | −3.9034 | 0.61472603e−02 | −0.11191186e−02 | 0.00000000e+00 | 0.00000000e+00 |
| 6 | 0.0000 | −0.18651349e−02 | 0.38921743e−02 | −0.13095347e−02 | 0.11230600e−03 |

Under such conditions, $v_1=56$, $v_2=30$, $v_3=56$ were achieved, thereby satisfying the conditions expressed by each of the expressions (1) to (3). Also, $f_1/f=1.10$ was achieved, thereby satisfying the condition expressed by the expression (4). Further, $r_3/f=-0.23$ was achieved, thereby satisfying the condition expressed by the expression (5). Furthermore, $r_5/f=0.52$ was achieved, thereby satisfying the condition expressed by the expression (6). Moreover, $r_4/f=-0.38$ was achieved, thereby satisfying the condition expressed by the expression (7).

Figure 12:
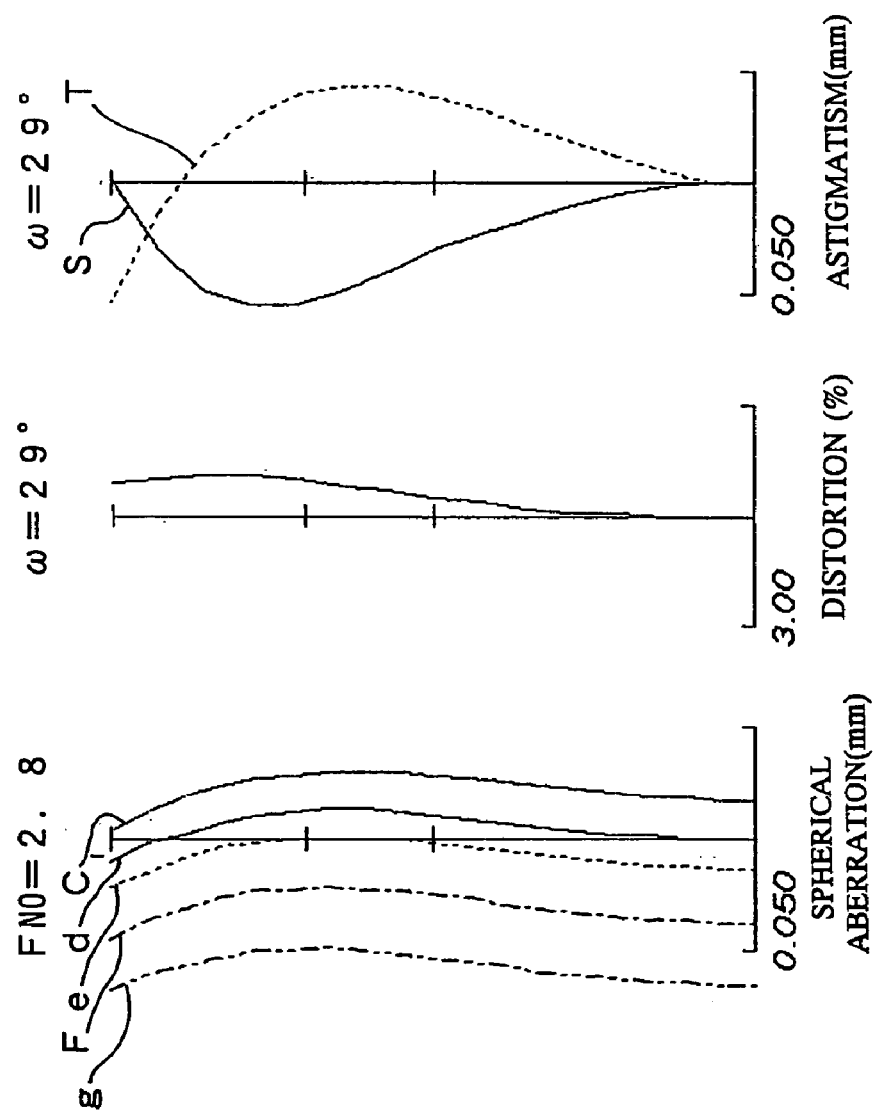
FIG. 12 is an explanatory illustration showing spherical aberration, distortion and astigmatism of the imaging lens system shown in FIG. 11.
Figure 13:
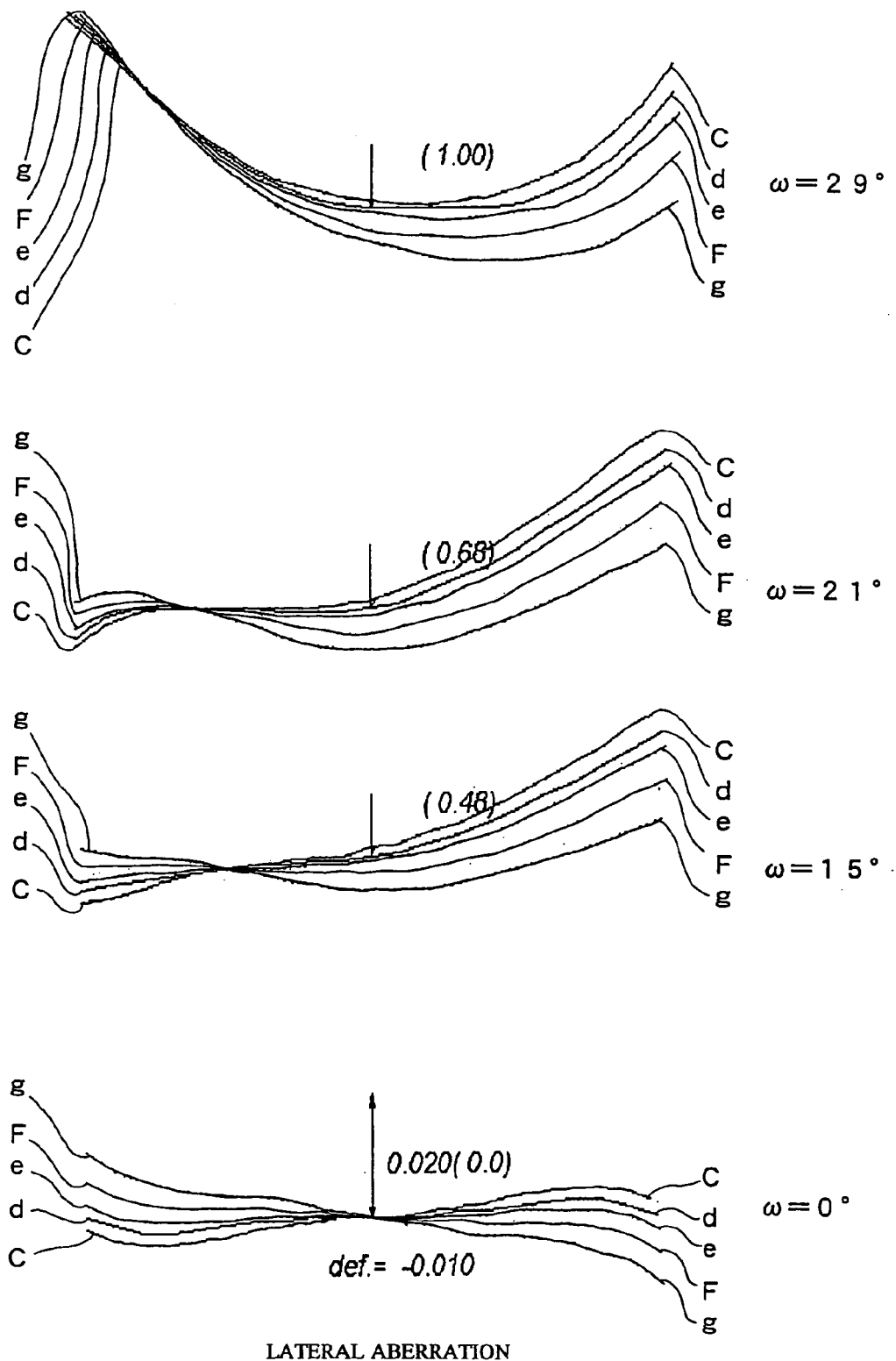
FIG. 13 is an explanatory illustration showing lateral aberration of the imaging lens system shown in FIG. 11.

FIG. 12 shows the spherical aberration, the distortion and the astigmatism of the imaging lens system of FOURTH EXAMPLE and FIG. 12 shows the lateral aberration.

The spherical aberration, the distortion, the astigmatism and the lateral aberration were all satisfied. According to the results, it can be seen that a sufficient optical property can be obtained. Also, the angle of incident against the sensor surface of the image sensor element can be controlled below 21.7° and the telecentricity can be excellently maintained.

Fifth Example

Figure 14:
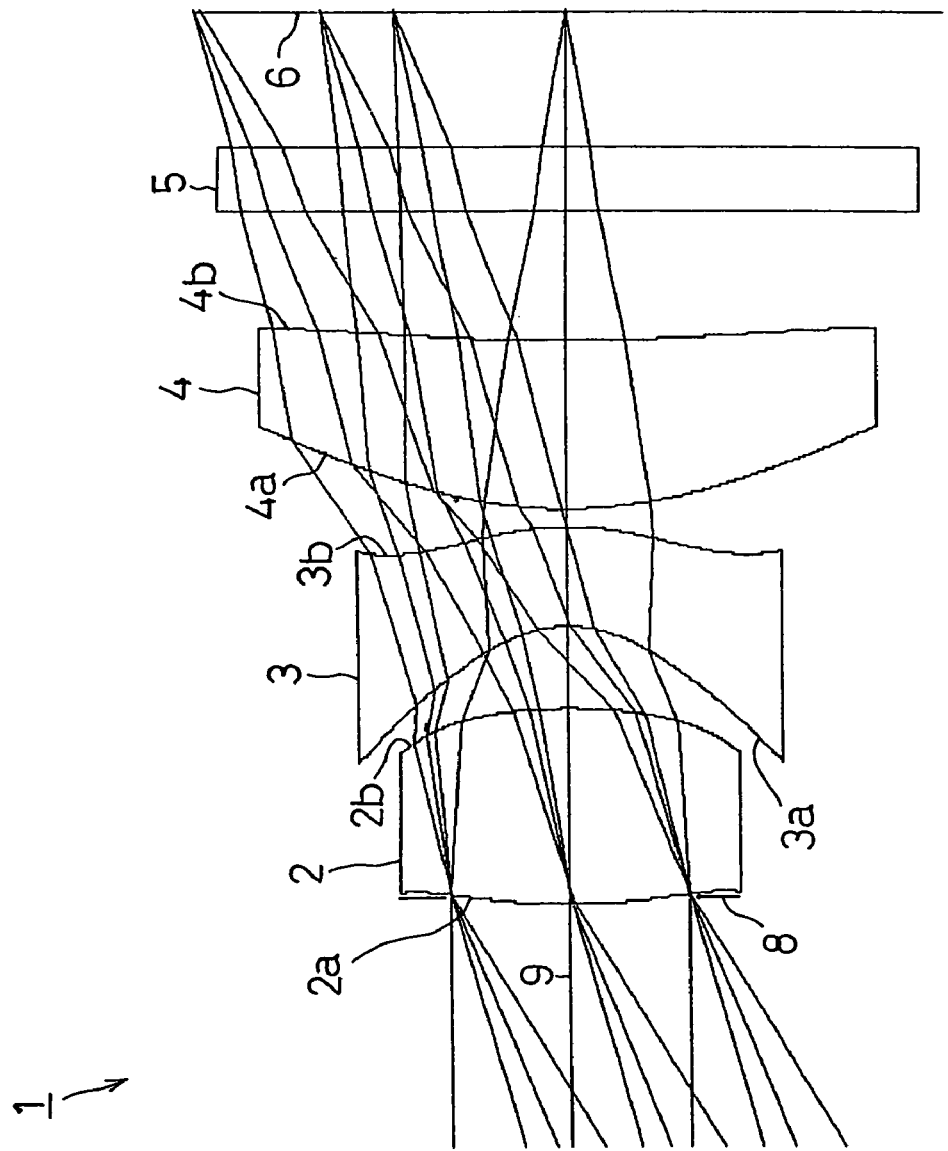
FIG. 14 is a schematic illustration showing FIFTH EXAMPLE of an imaging lens system according to the present invention.

FIG. 14 shows FIFTH EXAMPLE of the present invention. In FIFTH EXAMPLE, the diaphragm 8 was disposed on the first face 2a side of the first lens 2 in the same manner as the one shown in FIG. 1. In THIRD EXAMPLE, the diaphragm 8 was regarded as the same surface as the first face 2a of the first lens 2. The first lens was formed using glass and the second and third lenses were formed using a resin material, respectively.

The imaging lens system 1 of FIFTH EXAMPLE was set under the following condition.

f=4.75 mm, F NO=2.8, ω=29°, $f_1$=3.1536 mm

| Face Number | r | d | nd | vd |
|---|---|---|---|---|
| (Object Point) | | ∞ | | |
| 1(First Face of First Lens)(Diaphragm) | 4.115 | 1.5043 | 1.697 | 56 |
| 2(Second Face of First Lens) | −4.008 | 0.6264 | | |
| 3(First Face of Second Lens) | −0.876 | 0.7827 | 1.584 | 30 |
| 4(Second Face of Second Lens) | −1.939 | 0.1274 | | |
| 5(First Face of Third Lens) | 2.710 | 1.3040 | 1.525 | 56 |
| 6(Second Face of Third Lens) | 12.556 | 1.0000 | | |
| 7(First Face of Cover Glass) | 0.0 | 0.5000 | 1.517 | 64 |
| 8(Second Face of Cover Glass) (Image Surface) | 0.0 | | | |

Under such conditions, $v_1=56$, $v_2=30$, $v_3=56$ were achieved, thereby satisfying the conditions expressed by each of the expressions (1) to (3). Also, $f_1/f=0.66$ was achieved, thereby satisfying the condition expressed by the expression (4). Further, $r_3/f=-0.18$ was achieved, thereby satisfying the condition expressed by the expression (5). Furthermore, $r_5/f=0.57$ was achieved, thereby satisfying the condition expressed by the expression (6). Moreover, $r_4/f=-0.41$ was achieved, thereby satisfying the condition expressed by the expression (7).

Figure 15:
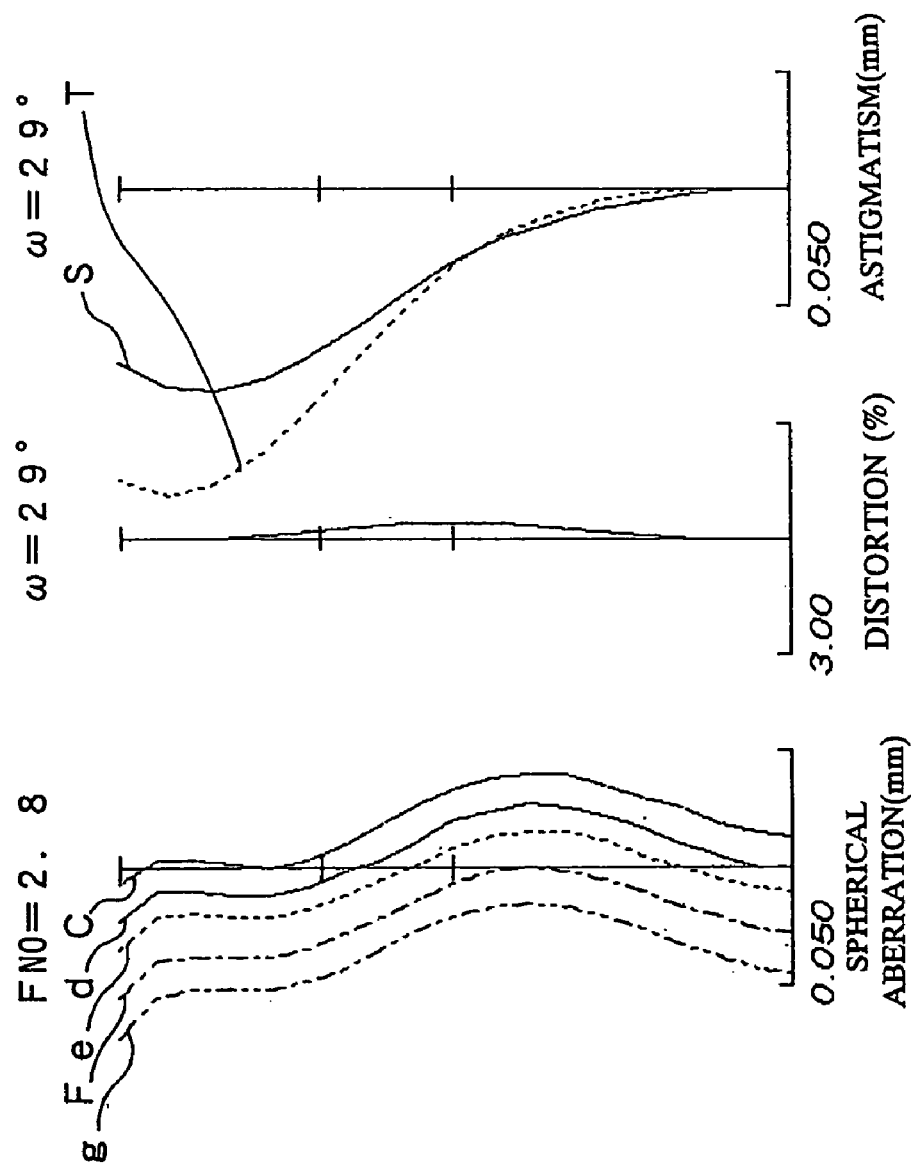
FIG. 15 is an explanatory illustration showing spherical aberration, distortion and astigmatism of the imaging lens system shown in FIG. 14.
Figure 16:
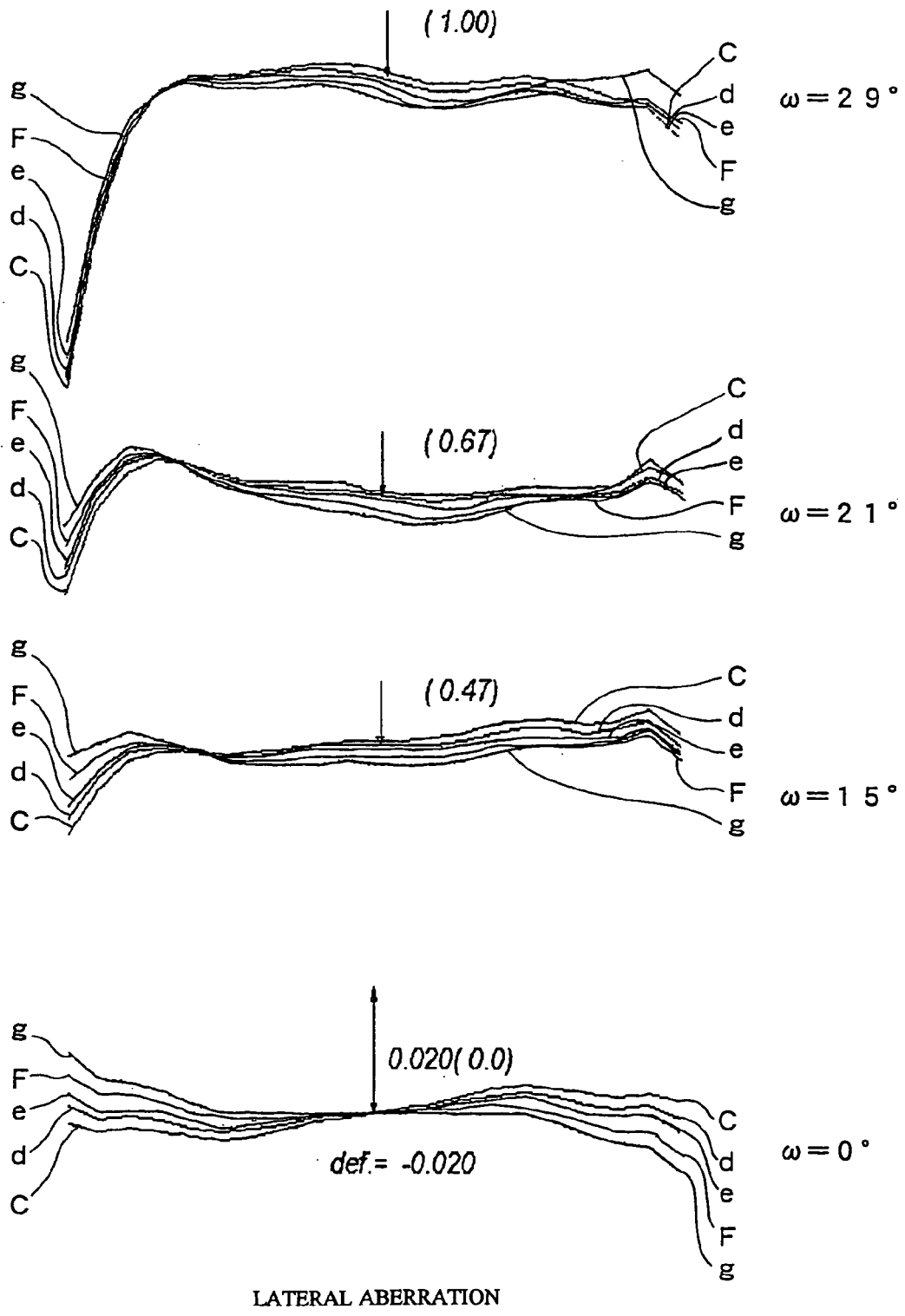
FIG. 16 is an explanatory illustration showing lateral aberration of the imaging lens system shown in FIG. 14.

FIG. 15 shows the spherical aberration, the distortion and the astigmatism of the imaging lens system of FIFTH EXAMPLE and FIG. 16 shows the lateral aberration.

The spherical aberration, the distortion, the astigmatism and the lateral aberration were all satisfied. According to the results, it can be seen that a sufficient optical property can be obtained. Also, the angle of incident against the sensor surface of the image sensor element can be controlled below 21 5° and the telecentricity can be excellently maintained.

Sixth Example

Figure 17:
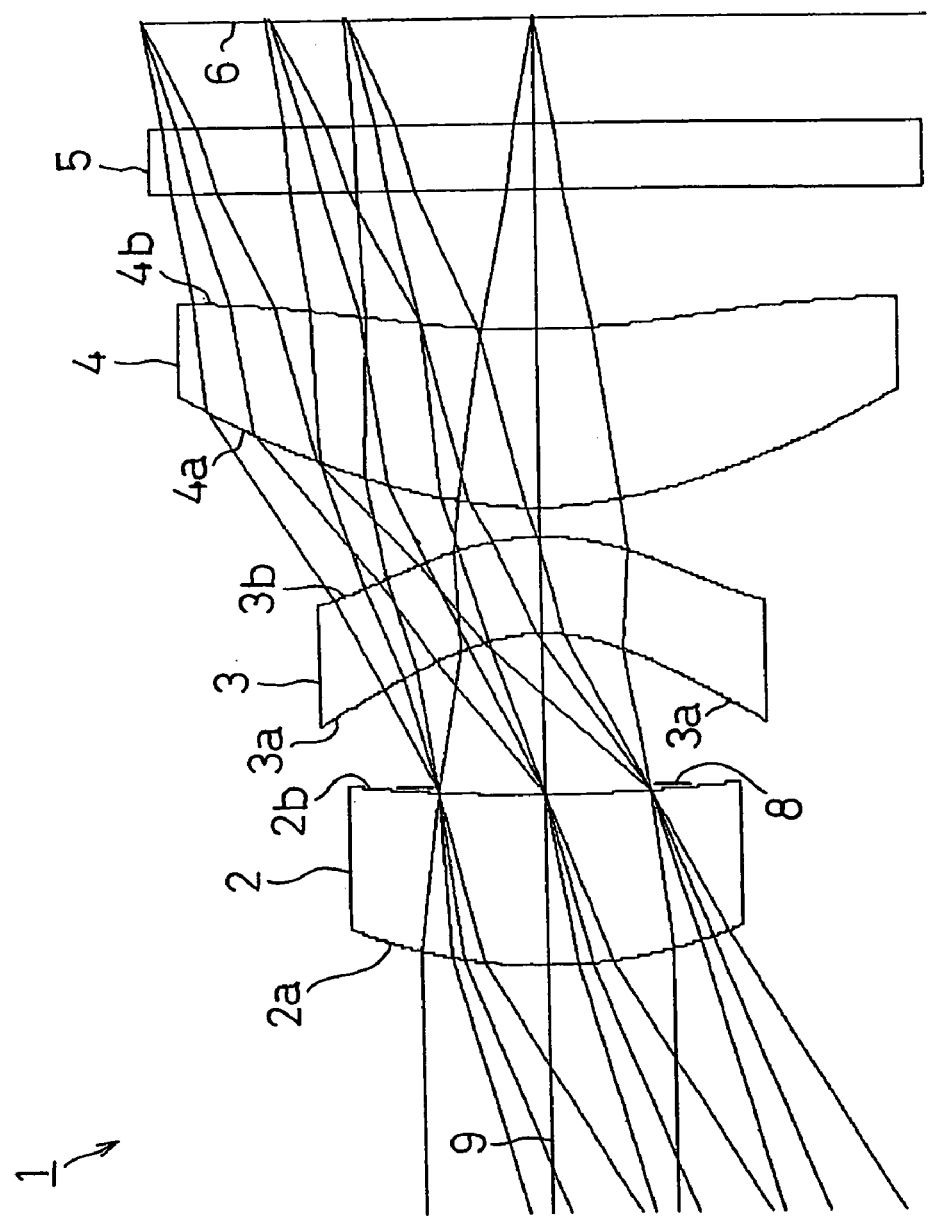
FIG. 17 is a schematic illustration showing SIXTH EXAMPLE of an imaging lens system according to the present invention.

FIG. 17 shows SIXTH EXAMPLE of the present invention. In SIXTH EXAMPLE, the diaphragm 8 was disposed between the first lens 2 and the second lens 3 in the same manner as FOURTH EXAMPLE shown in FIG. 4. In SIXTH EXAMPLE, as in FOURTH EXAMPLE, the diaphragm 8 was regarded as the same surface as the second face 2b of the first lens 2.

The imaging lens system 1 of FOURTH EXAMPLE was set under the following condition. Also, in SIXTH EXAMPLE, the first lens 2 was formed using glass and the second lens 3 and the third lens 4 were formed using the resin material.

f=4.75 mm, F NO=2.8, ω=290, $f_1$=5.6823 mm

| Face No. | k | A | B | C | D |
|---|---|---|---|---|---|
| 1 | −40.6463 | 0.46862172e−01 | −0.40054628e−01 | 0.00000000e+00 | 0.00000000e+00 |
| 2 | −0.3921 | −0.58928912e−01 | −0.98167341e−02 | 0.00000000e+00 | 0.00000000e+00 |
| 3 | −1.5346 | −0.92572613e−02 | 0.00000000e+00 | 0.00000000e+00 | 0.00000000e+00 |
| 4 | 0.1131 | 0.92093122e−01 | 0.74656687e−02 | 0.00000000e+00 | 0.00000000e+00 |
| 5 | −3.8826 | −0.32617100e−02 | 0.69650759e−03 | 0.00000000e+00 | 0.00000000e+00 |
| 6 | 0.0000 | −0.48048918e−02 | 0.23886971e−03 | 0.00000000e+00 | 0.00000000e+00 |

| Face Number | r | d | nd | νd |
|---|---|---|---|---|
| (Object Point) | | ∞ | | |
| 1(First Face of First Lens) | 3.332 | 1.25 | 1.773 | 50 |
| 2(Second Face of First Lens) (Diaphragm) | 11.575 | 1.16 | | |
| 3(First Face of Second Lens) | −1.273 | 0.70 | 1.584 | 30 |
| 4(Second Face of Second Lens) | −1.700 | 0.21 | | |
| 5(First Face of Third Lens) | 2.564 | 1.29 | 1.523 | 56 |
| 6(Second Face of Third Lens) | 5.259 | 1.00 | | |
| 7(First Face of Cover Glass) | 0.0 | 0.50 | 1.517 | 64 |
| 8(Second Face of Cover Glass) (Image Surface) | 0.0 | | | |

| Face No. | k | A | B | C | D |
|---|---|---|---|---|---|
| 3 | −0.5109 | 0.93172346e−01 | 0.00000000e+00 | 0.00000000e+00 | 0.00000000e+00 |
| 4 | −0.1326 | 0.39973032e−01 | 0.14945454e−01 | 0.00000000e+00 | 0.00000000e+00 |
| 5 | −4.1163 | −0.14587145e−02 | 0.72520220e−03 | −0.42609657e−04 | 0.00000000e+00 |
| 6 | 0.0000 | −0.15997573e−01 | 0.87121930e−03 | 0.00000000e+00 | 0.00000000e+00 |

Under such conditions, $\nu_1=50$, $\nu_2=30$, $\nu_3=56$ were achieved, thereby satisfying the conditions expressed by each of the expressions (1) to (3). Also, $f_1/f=1.20$ was achieved, thereby satisfying the condition expressed by the expression (4). Further, $r_3/f=-0.27$ was achieved, thereby satisfying the condition expressed by the expression (5). Furthermore, $r_5 f=0.54$ was achieved, thereby satisfying the condition expressed by the expression (6). Moreover, $r_4/f=-0.36$ was achieved, thereby satisfying the condition expressed by the expression (7).

Figure 18:
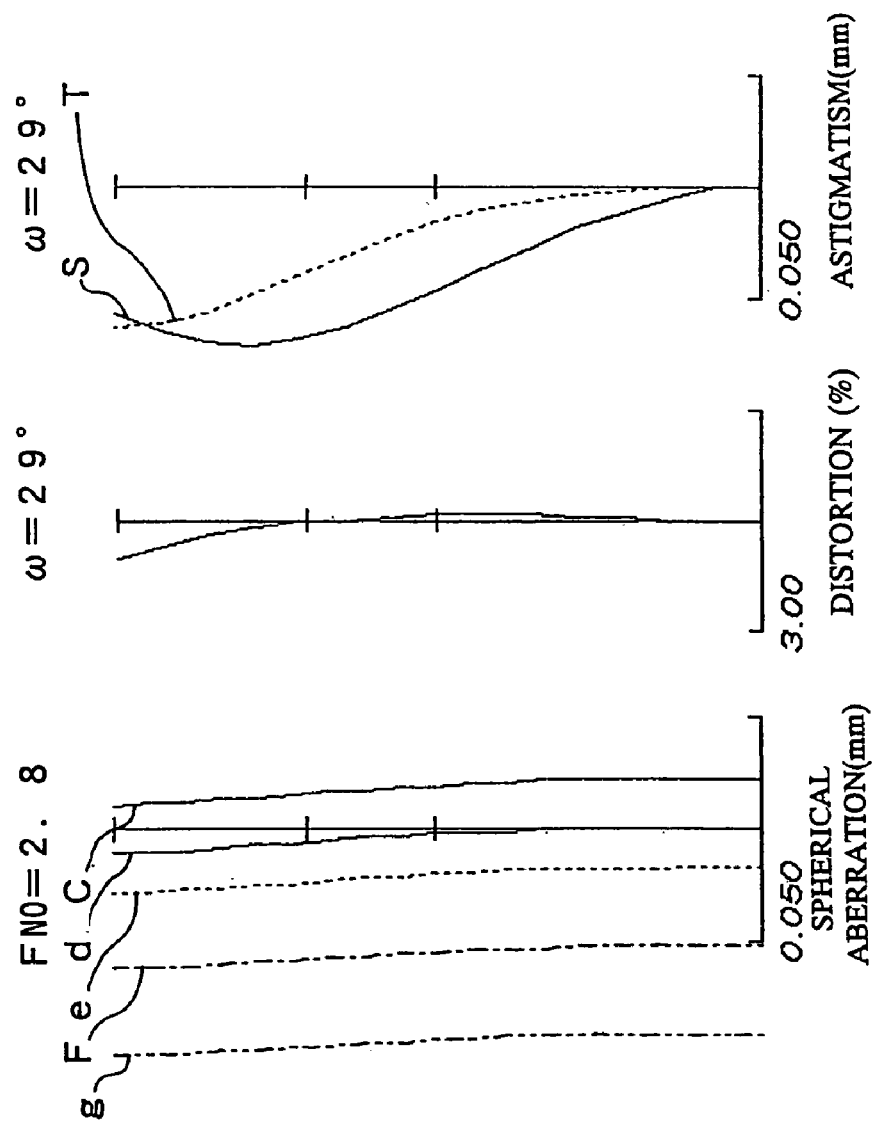
FIG. 18 is an explanatory illustration showing spherical aberration, distortion and astigmatism of the imaging lens system shown in FIG. 17.
Figure 19:
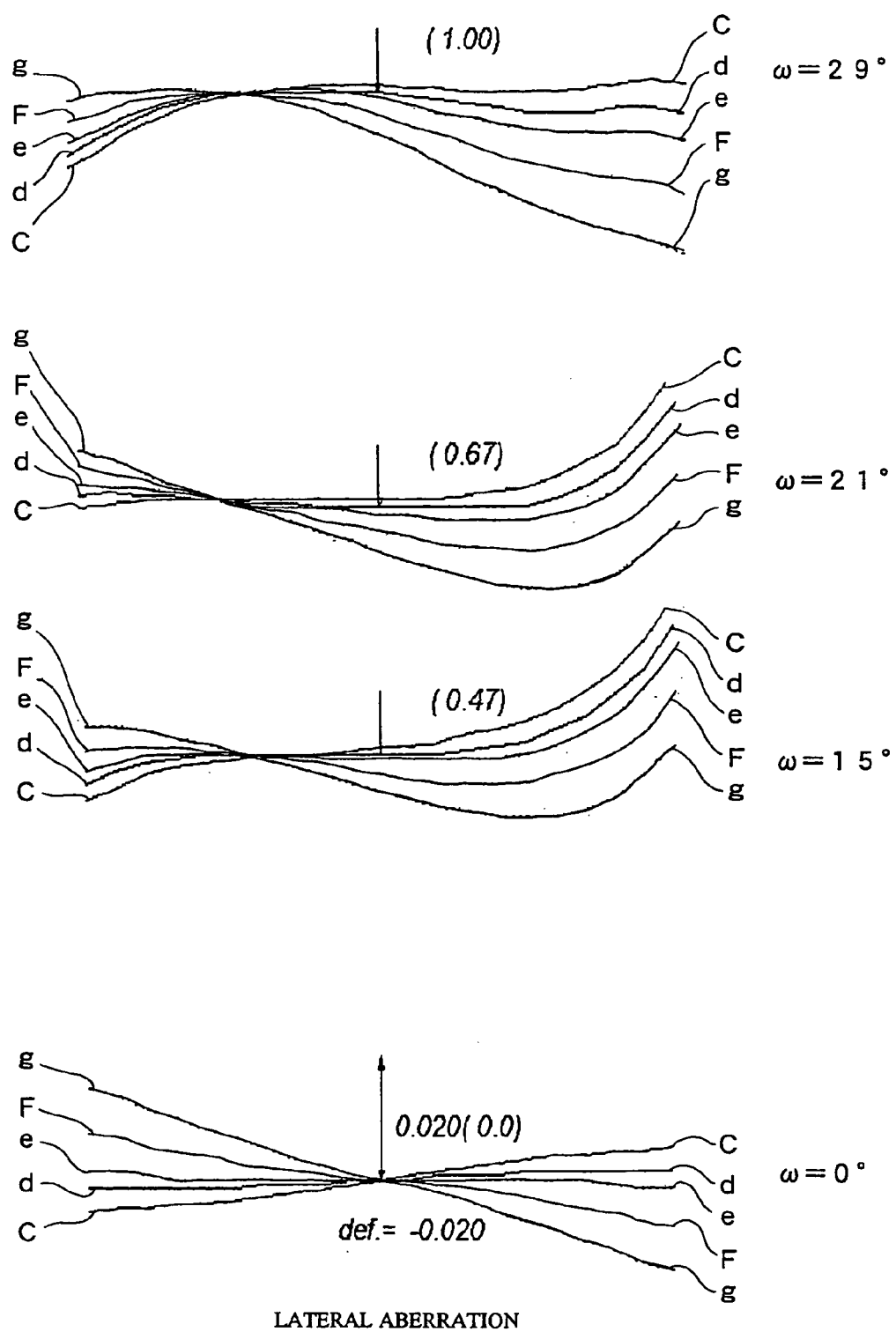
FIG. 19 is an explanatory illustration showing lateral aberration of the imaging lens system shown in FIG. 17.

FIG. 18 shows the spherical aberration, the distortion and the astigmatism of the imaging lens system of FIFTH EXAMPLE and FIG. 19 shows the lateral aberration.

The spherical aberration, the distortion, the astigmatism and the lateral aberration were all satisfied. According to the results, it can be seen that a sufficient optical property can be obtained. Also, the angle of incident against the sensor surface of the image sensor element can be controlled below 17.1° and the telecentricity can be excellently maintained.

The present invention is not limited to the above-described embodiment and various modifications are possible as necessary.

What is claimed is:

1. An imaging lens system, consisting of: a first lens having a main positive power selected from the group consisting of a lens having a pair of convex surfaces with one of said convex surfaces facing an object side, a lens having a plane surface facing an image surface side and a convex surface facing an object side, and a meniscus form lens having a convex surface facing the object side; a second lens in a meniscus shape having a negative power whose convex surface facing an image surface side; and a third lens having a positive power whose convex surface facing the object side; said three lenses are being disposed in order from the object side to the image surface side; and wherein a diaphragm is disposed on the object side of said first lens.

2. The imaging lens system according to claim 1, wherein, further, conditions expressed by each of following expressions (1) to (3) are to be satisfied;

$$40<\nu_1<70 \quad (1)$$

$$20<\nu_2<40 \quad (2)$$

$$40<\nu_3<70 \quad (3)$$

where, $\nu_1$: Abbe number of said first lens
$\nu_2$: Abbe number of said second lens
$\nu_3$: Abbe number of said third lens.

3. The imaging lens system according to claim 1, wherein, in a surface of said second lens on the image surface side, radius of center curvature on a periphery side is formed larger than radius of center curvature on a core side.

4. The imaging lens system according to claim 1, wherein, in a surface of said third lens on the object side, radius of center curvature on a periphery side is formed larger than radius of center curvature on a core side.

5. The imaging lens system according to claim 1, wherein, in a surface of said third lens on the image surface side, radius of center curvature on a periphery side is formed larger than radius of center curvature on a core side.

6. The imaging lens system according to claim 1, wherein the surface of said third lens on the image surface side is formed in a shape which curves towards the object side from the core side to the periphery side.

7. The imaging lens system according to claim 1, wherein, in each of said first lens, said second lens and said third lens, at least either one of the surfaces on the object side or the image surface side is formed in an aspherical shape.

8. The imaging lens system according to claim 1, wherein at least one out of said first lens, said second lens and said third lens is formed by a resin material.

9. The imaging lens system according to claim 1, wherein, further, a condition expressed by a following expression (4) is to be satisfied;

$$0.6<f_1/f<1.3 \quad (4)$$

where, $f_1$: focal length of said first lens
f: focal length of entire lens system.

10. The imaging lens system according to claim 1, wherein, further, a condition expressed by a following expression (5) is to be satisfied;

$$-0.4<r_3/f<-0.1 \quad (5)$$

where, $r_3$: radius of center curvature of a first surface of said second lens on the object side.

11. The imaging lens system according to claim 1, wherein, further, a condition expressed by a following expression (6) is to be satisfied;

$$0.4<r_5/f<0.6 \quad (6)$$

where, $r_5$: radius of center curvature of a first surface of said third lens on the object side.

12. An image lens system, consisting of: a first lens having a main positive power having one of its convex surfaces facing an object side; a second lens in a meniscus shape having a negative power whose convex surface facing an image surface side; and a third lens having a positive power whose convex surface facing the object side; said three lenses are being disposed in order from the object side to the image surface side; and wherein a diaphragm is disposed on the object side of said first lens, wherein, further, a condition expressed by the following expression (6) is to be satisfied;

$$0.4 < r_5/f < 0.6 \qquad (6)$$

where, $r_5$: radius of center curvature of the convex surface of said third lens and f is a focal length of said image lens system.

* * * * *